United States Patent [19]

Wattron et al.

[11] 4,346,549
[45] Aug. 31, 1982

[54] AGRICULTURAL MACHINE FOR TEDDING AND WINDROWING FODDER CROPS

[75] Inventors: Albert Wattron, Schwenheim; Michel Quirin, Allenwiller, both of France

[73] Assignee: Belrecolt S.A., Marmoutier, France

[21] Appl. No.: 215,851

[22] Filed: Dec. 12, 1980

[30] Foreign Application Priority Data

Dec. 20, 1979 [FR] France ............................. 79 31889

[51] Int. Cl.³ ........................................... A01D 79/00
[52] U.S. Cl. ..................................................... 56/370
[58] Field of Search ................ 56/370, 326, 377, 192, 56/DIG. 1

[56] References Cited
U.S. PATENT DOCUMENTS 3,896,613 7/1975 van der Lely ......................... 56/370
4,203,277 5/1980 Kaetzel ................................. 56/370
4,269,019 5/1981 Strobel ................................. 56/370

Primary Examiner—Jay N. Eskovitz
Attorney, Agent, or Firm—Ernest F. Marmorek

[57] ABSTRACT

An agricultural machine for tedding and windrowing fodder crops comprises a pair of drums (1,2) rotatable about shafts (12,13) and interconnectd by a chassis (3) which is connected to a coupling member (4) by a connecting beam (5). The coupling member (4) has attachment points (6,7,8) for coupling the machine to a tractor. Each drum carries at its lower portion a flexible, deformable skirt (17,18) for grasping and transporting the fodder. Means (19) are associated with each skirt (17,18) for carrying out tedding or windrowing. The means (19) may comprise drive means (20) which are movable into a first position for tedding and into a second position for windrowing. The drive means are pivotally mounted on the walls of the drums (1,2) and movement of the drive means between their two positions is achieved by means of a screw (35). Other means are disclosed in the specification for achieving tedding and windrowing.

68 Claims, 30 Drawing Figures

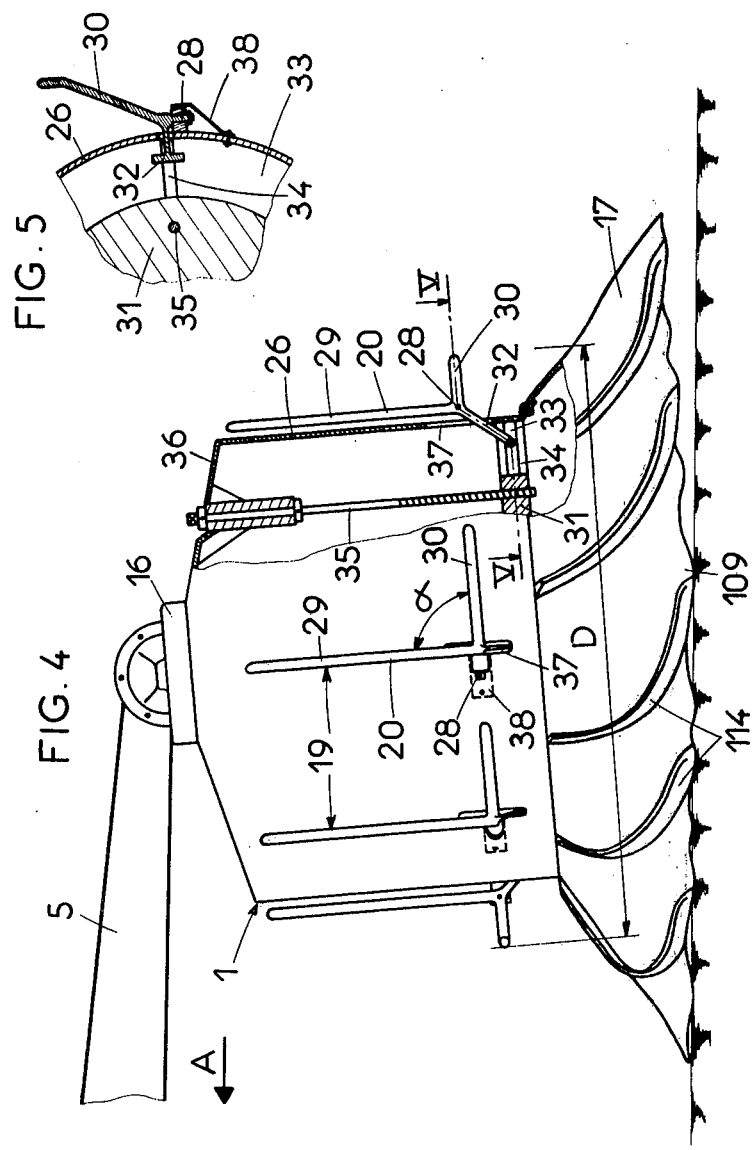

AGRICULTURAL MACHINE FOR TEDDING AND WINDROWING FODDER CROPS

The present invention relates to a haymaking machine comprising at least one drum which is rotatable about a substantially vertical or slightly inclined shaft and carries in its lower portion a flexible, deformable skirt for grasping and transporting the fodder.

BACKGROUND OF THE INVENTION

A machine of this type can be satisfactorily used for windrowing. Thus, the skirt plunges below the fodder to be displaced, whilst adapting to changes in the ground level and transports the fodder on its upper surface. As a result, the fodder is not dragged on the ground so that it is not soiled by the ground, which could lead to it being rejected by cattle. In addition, the flexible, deformable skirt is does not damage the cut fodder and young plant shoots. Furthermore, owing to the absence of metal forks which displace the fodder by scraping on the ground, it is possible to eliminate the danger constituted by broken forks for balers, ensilaging machines and self-loading trailers for gathering up the fodder.

However, this machine is hardly suitable for tedding. For the latter operation, the generally still green fodder must be treated more energetically and must preferably be dispersed over a considerable width behind the machine.

SUMMARY OF THE INVENTION

The present invention aims to provide a haymaking machine as described hereinbefore and which makes it possible to carry out both tedding and windrowing.

According to the invention, there is provided a haymaking machine having at least one drum rotated about a substantially vertical or slightly inclined shaft and which in its lower part carries a flexible, deformable skirt for grasping and transporting the fodder, wherein regulatable or detachable converting means are associated with the skirt for carrying out tedding or windrowing.

The regulatable or detachable means can be constituted by entraining or impelling means, which are movable into at least two different positions, one for tedding and the other for windrowing. For this purpose, the impelling means can be articulated to the wall of the drum(s) or to a support, preferably located within the drum(s). As a result of these articulations, the impelling means can be oriented in the direction opposite to the drum rotation direction in such a way that they aid the displacement of the fodder on the front part of their trajectory and free it without difficulty on the lateral part of their trajectory with a view to forming a windrow. They can also be brought into a second position in which they have a different orientation, for example, in substantially radial planes in order to increase their engagement with the fodder. The latter is then entrained towards the rear of the drum(s) and is uniformly spread behind the machine, whilst being turned over.

The support to which the impelling means are articulated can advantageously be offset with respect to the drum rotation shaft. This support can also be displaced and arrested in at least two different positions. In one of these positions, the impelling means to a considerable extent extend beyond the drum over the front portion of their trajectory. Thus, they aid the transportation of the fodder in said front portion and free it as soon as it reaches the rear of the drum for the purpose of forming a windrow. In the other position of the offset support, the impelling means largely extend outside their drum over the rear part of their trajectory. Therefore, they again disperse behind the machine the fodder gathered up by the skirt.

The means according to the invention can also be impelling means guided by means of rollers which when working are displaced on a cam having two guide paths or tracks. One of these tracks serves to guide the impelling means during windrowing, whilst the other track guides them during tedding.

The means associated with the drum skirts for windrowing or tedding can also be constituted by one or more spreaders. For tedding, the spreaders are positioned behind the drums and are rotated so as to spread behind the machine the fodder transported by the drum skirts. For windrowing, the spreaders can either be removed or tilted out of the fodder trajectory.

These means can also be constituted by guide rods. During tedding, these rods extend in the form of a mould-board above the skirts of the drums and turn over the fodder gathered up by the skirts in the manner of a plough. For windrowing, the rods are rendered inoperative, e.g. by displacing them by 180° in such a way that they extend above the drums or by removing them from the machine.

According to another embodiment, the windrowing and tedding means are constituted by substantially V-shaped impelling means, which are joined to the drum walls. One of their sides is substantially tangential to the walls, whilst the other side is in a substantially radial plane. During windrowing, the drums are arranged in such a way that the sides of the impelling means which are substantially tangential to the drum walls come into contact with the fodder or cut herbage to be displaced. Due to their shape, these sides easily release the fodder with a view to forming a windrow. When tedding, the drum position is reversed in such a way that it is the other sides of the impelling means which come into contact with the fodder to be displaced. As a result of their orientation, these sides interact much more vigorously with the fodder. They therefore move it towards the rear of the drums and spread it behind the machine, whilst turning over the fodder.

In the case where the machine according to the invention has at least two drums, an important feature consists of providing their skirts with projections, which engage between the drums during haytedding. This leads to a partial overlapping of the trajectories described by the skirts, which ensures an integral gathering up of the fodder on the ground. During windrowing, the drums are preferably moved away from one another in order to free the location of the windrow. To this end, the machine chassis is advantageously telescopic.

BRIEF DESCRIPTION OF THE DRAWINGS

The invention will now be further described, by way of non limitative example, with reference to the drawings, which show:

FIG. 4 a part sectional side view of the drum of FIG. 3.

FIG. 5 a section along the broken plane V—V of FIG. 4.

DESCRIPTION OF THE PREFERRED EMBODIMENTS

Figure 1:
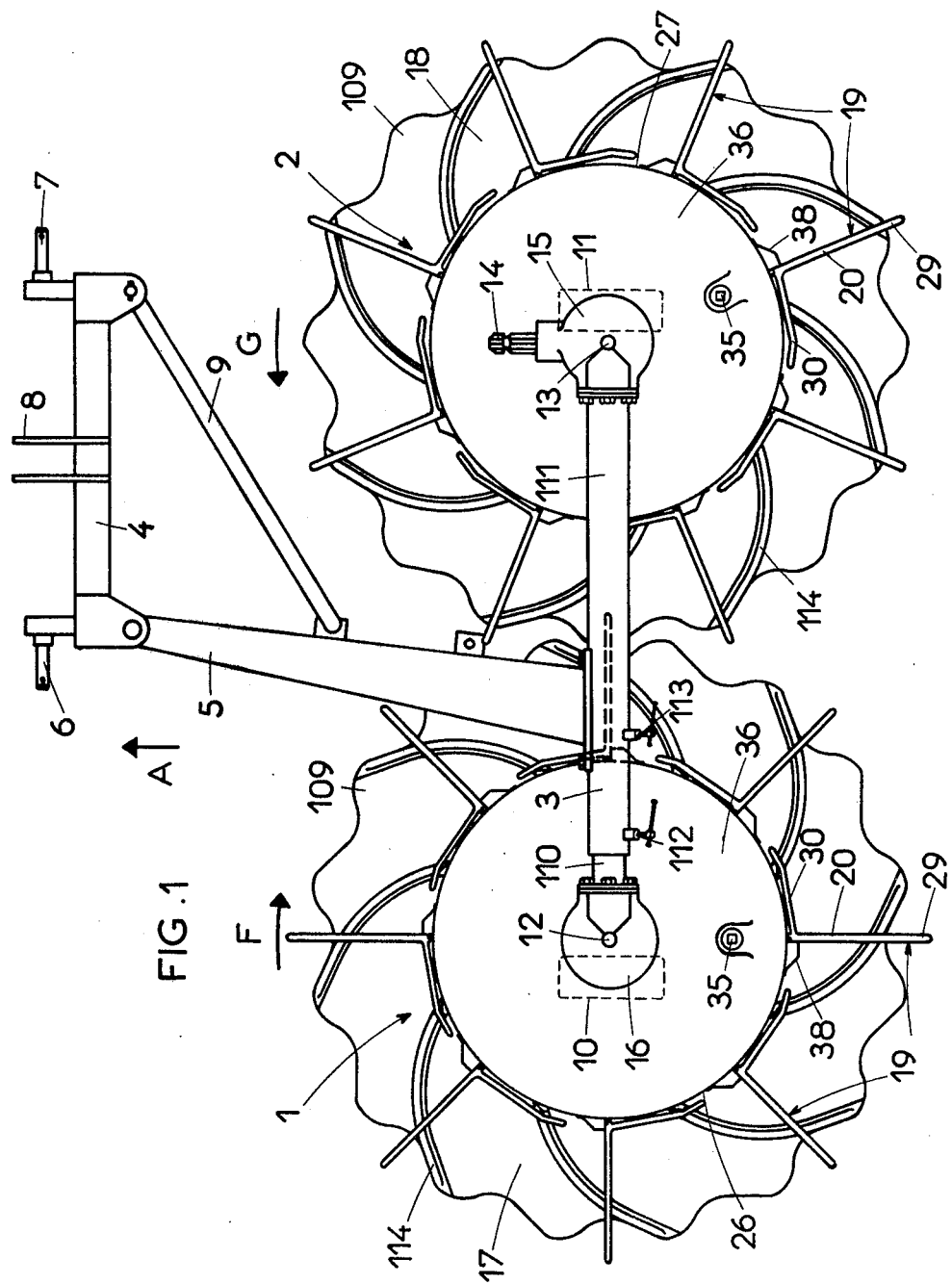
FIG. 1 a plan view of the machine according to the invention in the tedding position.
Figure 2:
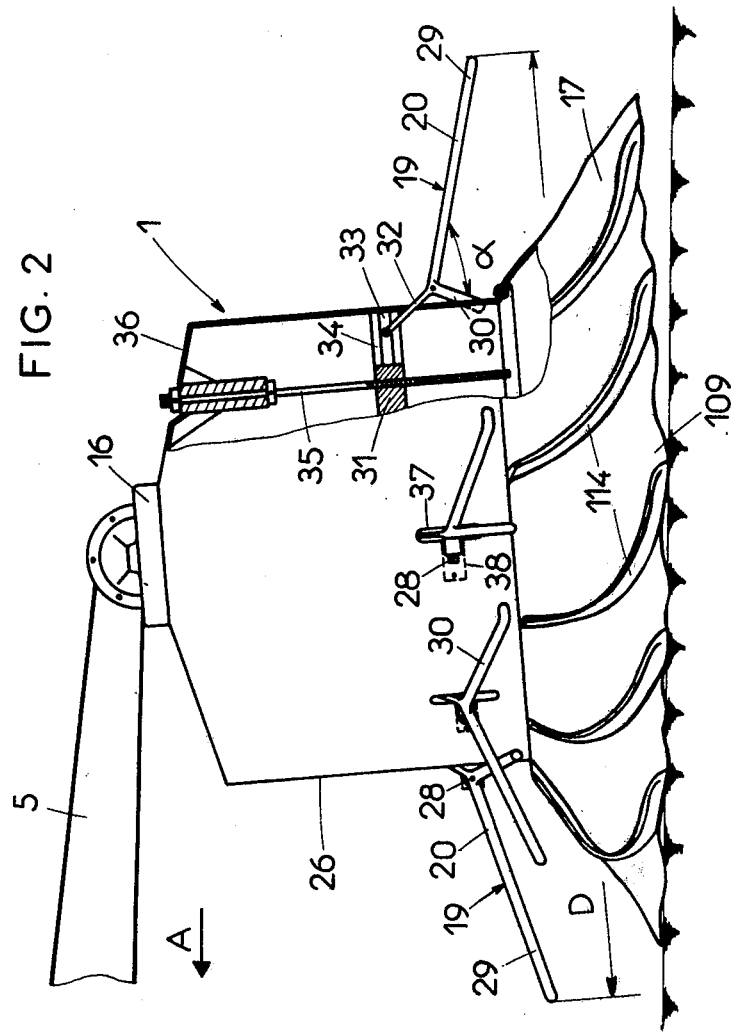
FIG. 2 a part sectional side view of a drum of the machine of FIG. 1.
Figure 3:
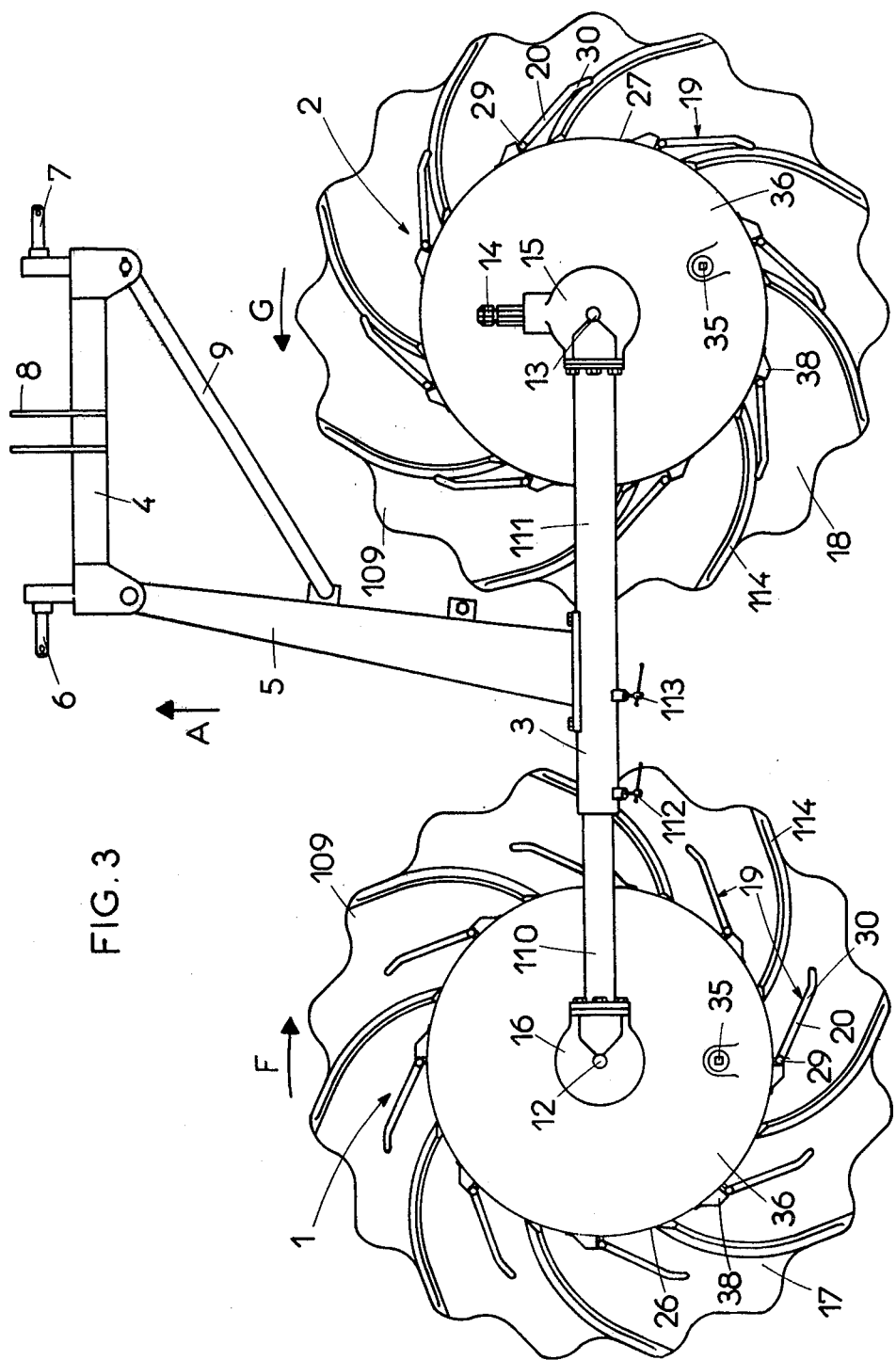
FIG. 3 a plan view of the machine of FIG. 1 in the windrowing position.

As shown in the attached drawings, the machine according to the invention comprises two drums (1, 2) interconnected by means of a chassis (3). The chassis is itself connected to a coupling member (4) by means of a connecting beam (5). The coupling member has two lower attachment points (6, 7) and an upper attachment point (8) for coupling to the three-point linkage device of a not shown tractor. The position of the connecting beam (5) relative to coupling member (4) can be defined by means of a cross-bar (9). Beneath each drum (1, 2) is provided a small wheel (10, 11) making it possible for the machine to travel along the ground.

When working the two drums (1, 2) are rotated in accordance with the arrows (F, G) about shafts (12, 13), which are substantially vertical or sightly forwardly inclined, when viewed in the forward travel direction indicated by arrow (A). This driving action in obtained in per se known manner from the power take-off shaft of the tractor. This shaft is connected by means of a not shown cardan shaft to a grooved shaft end (14). Shaft (14) engages in a gear case (15) and drives drum (2) by means of a bevel gear and a toothed wheel located in the said case. The second drum (1) is driven by means of a transmission shaft located in chassis (3). At its end located in the gear case (15), this shaft has a bevel gear which meshes with the aforementioned toothed ring, whilst at its other end extending in the gear case (16) surmounting the second drum (1), it has a second bevel gear which engages with a toothed wheel integral with drum (1).

Each of the drums (1, 2) carries in its lower portion a flexible deformable skirt (17, 18) for grasping and transporting the fodder. When working, skirts (17, 18) plunge beneath the fodder to be displaced, whilst adapting to level changes in the ground and transporting the fodder on their upper surface.

According to the invention, regulatable or detachable means (19) are associated with skirts (17, 18) for carrying out windrowing or tedding.

In the embodiments according to FIGS. 1 to 21, the means (19) are constituted by entraining or impelling means (20 to 25), which can be brought into at least two different positions, one of these positions being intended for windrowing and the other for tedding. The diameter (D) of the trajectories described by impelling (20, 25) differs according to whether the latter are located in one or other of the aforementioned positions. The diameter (D) is advantageously larger for tedding than for windrowing. The impelling means (20 to 25) are preferably formed by straight or curved rods, e.g. made from steel or a plastics material.

In the embodiment according to FIGS. 1 to 5 the impelling means (20) are articulated to walls (26, 27) of drums (1, 2) by means of pins (28) positioned in a plane substantially perpendicular to the rotation shafts (12, 13) of drums (1, 2). Each of the impelling means (20) has two branches (29, 30) of different lengths and forming an angle (α) close to 90° between them. By pivoting about the hinge pins (28) the branches can be brought into two different positions. In one of these positions, tedding can be carried out, whereas in the other position windrowing can be carried out. In the tedding position (FIGS. 1 and 2), the longest branches (29) of impelling means (20) extend in substantially radial planes. In addition, they are directed slightly downwards so as to be closer to the skirts (17, 18) of drums (1, 2). In this position, the branches (29) engage well on the fodder gathered up by the skirts (17, 18). They entrain it to the rear of the drums (1, 2) and spread it uniformly behind the machine, whilst turning it over. In this tedding position, the shortest branches (30) of impelling means (20) are substantially tangential to the walls (16, 27), so that it has no effect on the fodder.

In the windrowing position (FIGS. 3 and 4), the shortest branches (30) of impelling means (20) are oriented in a direction opposite to the rotation directions (F and G) of drums (1, 2), whilst branches (29) extend substantially parallel to the drum walls (26, 27). The branches (30) aid the displacement of the fodder on the front part of their trajectory and free it easily in the lateral part of their trajectory for the purpose of forming a windrow.

Impelling means (20) are pivoted about the hinge pins (28) by means of positioning plate (31) arranged within the drums (1, 2). All the impelling means (20) of the same drum (1 or 2) are connected to the plate (31) by means of arms (32) passing through openings (37) provided in walls (26, 27) of drums (1, 2). As can be gathered in detail from FIG. 5, plate (31) has a groove (33) and radial notches (34) in which engage the ends of the arms (32), which are shaped like a T. Plate (31) is guided on shaft (12, or 13) of drum (1 or 2) and can be vertically adjusted by means of a screw (35). The latter passes through the upper surface (36) of drums (1, 2) so that it can be manipulated from the outside. When plate (31) is moved downwards, impelling means (20) are moved into the windrowing position. However, if it is moved upwards, it transfers the impelling means into the tedding position. Plate (31) also ensures the immobilisation of impelling means (20) in each of the said positions.

To prevent fodder from engaging on the hinge pins (28), the latter are protected by covers (38).

Figure 6:
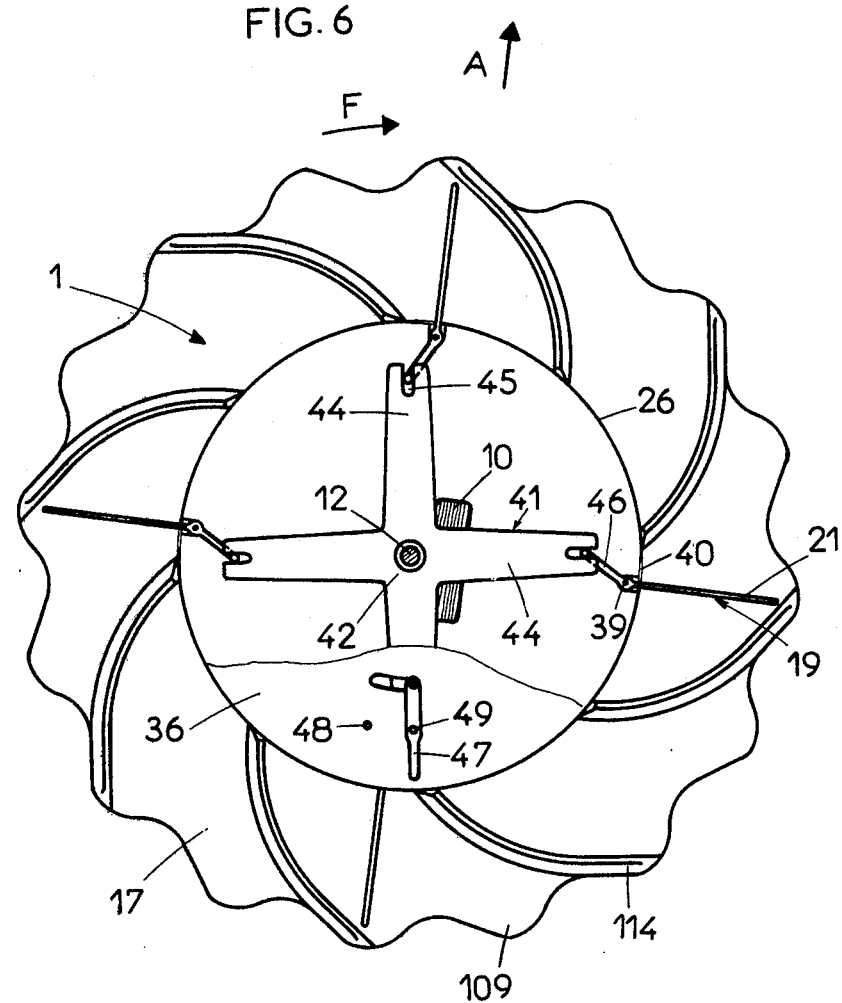
FIG. 6 a part sectional plan view of a constructional variant of the drum according to the invention, with the drum in the tedding position.
Figure 7:
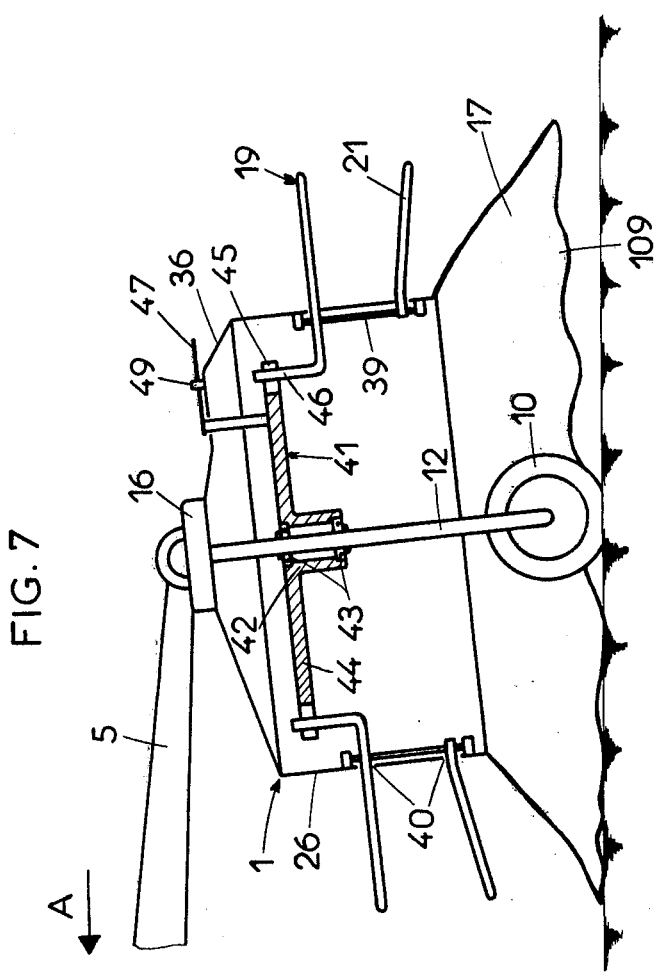
FIG. 7 a vertical section of the drum of FIG. 6.
Figure 8:
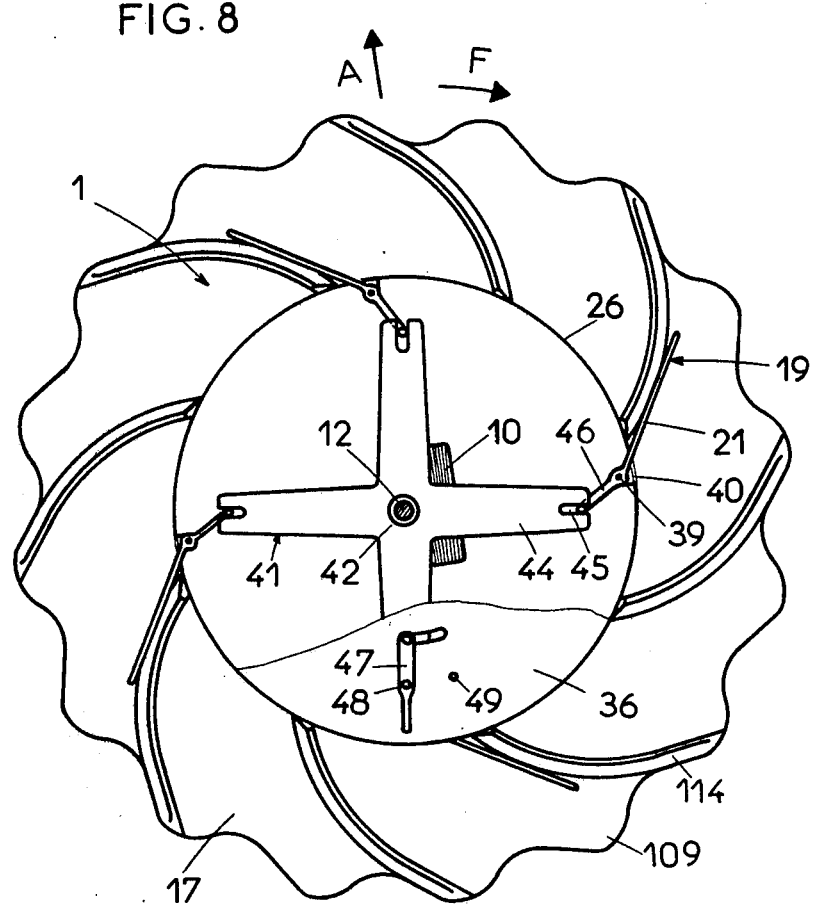
FIG. 8 a view identical to that of FIG. 6, with the drum in the windrowing position.

In the constructional variant of FIGS. 6 to 8, impelling means (21) can pivot about spindles (39) substantially parallel to the rotation shaft (12 or 13) of the corresponding drum (1 or 2). The spindles (39) are arranged within the drum (1, 2) and are protected by the latter. The impelling means (21) extend through slots (40) made in walls (26, 27). Each of the spindles (39) has two impelling means (21) arranged in a superimposed manner. The lower impelling means is preferably oriented slightly groundwards in order to come closer to the drum skirts (17, 18).

The impelling means are connected to a central regulating member (41) arranged within the drums (1, 2). This member is constituted by a hub (42) guided in rotation on the shafts (12, 13) of drums (1, 2) by ball bearings (43). This hub is provided with arms (44) having at their end a slot (45) in which engages a lug (46) integral with impelling means (21). The regulating member (41) can be correspondingly rotated about the corresponding shaft (12, 13) by means of a lever (47) positioned above the drum (1, 2). The lever (47) also makes it possible to immobilise the regulating member in at least two different positions by means of stop members (48, 49). During the rotation of the regulating member, it causes the impelling means (21) to pivot about their spindles (39). Thus, it makes it possible to introduce and stop the impelling means in a substantially radial position (FIG. 6) or in a position in which they are directed opposite to the rotation directions (F and G) of drums (1, 2) (FIG. 8). In the first position impelling means (21) ted the fodder, whilst in the second position a windrow can be formed.

Figure 9:
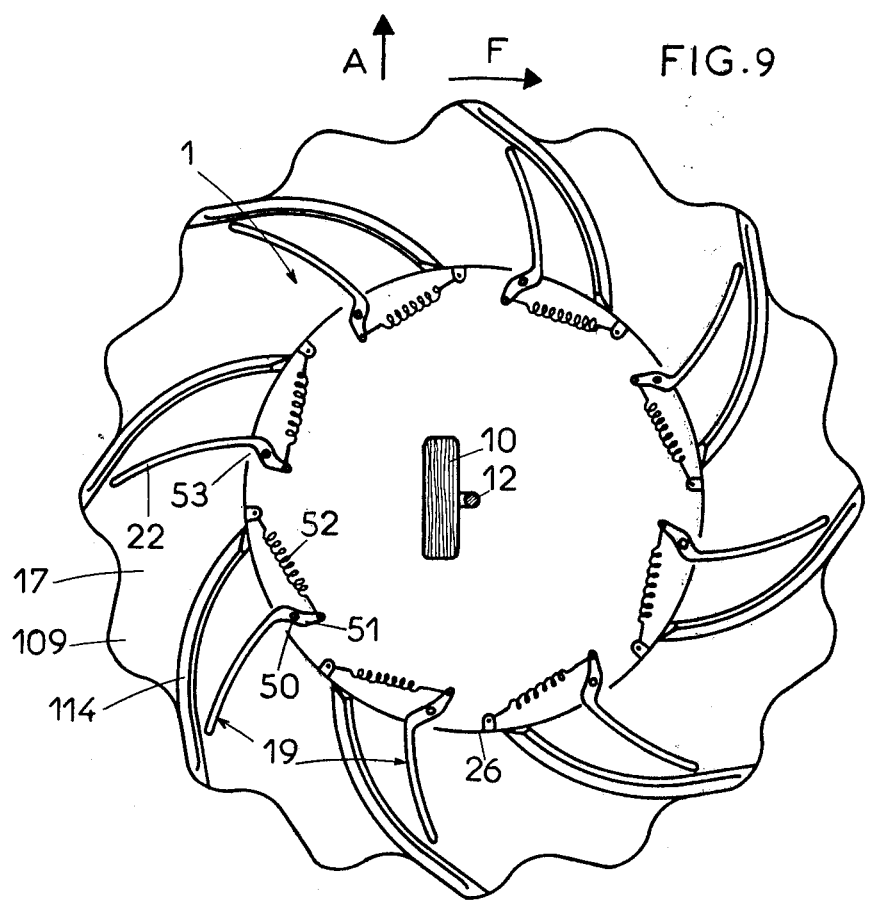
FIG. 9 in section along the plane IX—IX of FIG. 10, another variant of the drum according to the invention in the tedding position.
Figure 10:
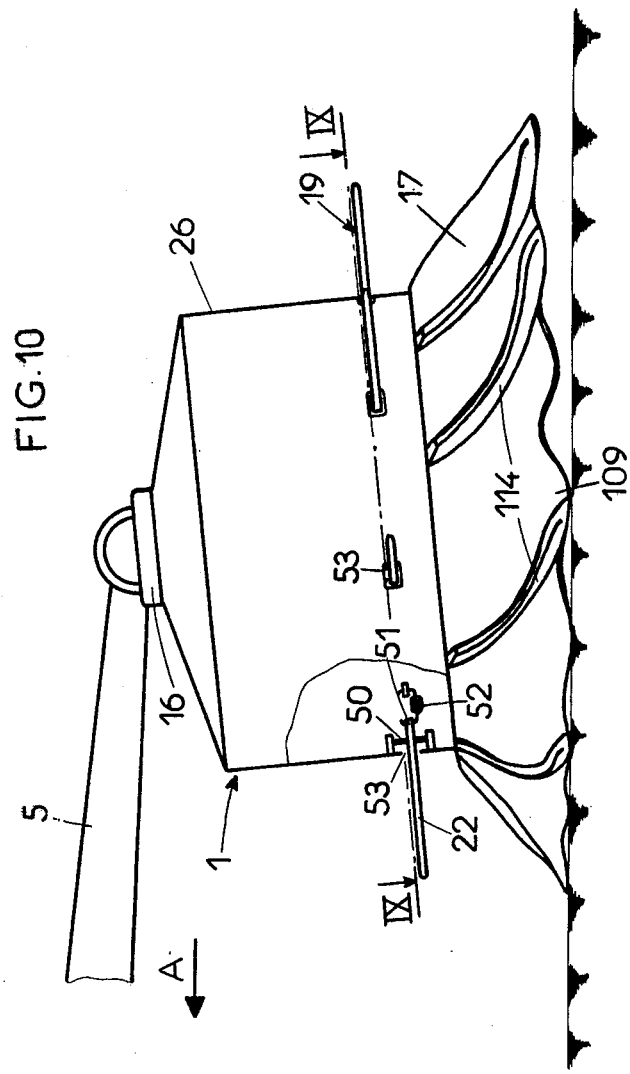
FIG. 10 a part sectional side view of the drum of FIG. 9.
Figure 11:
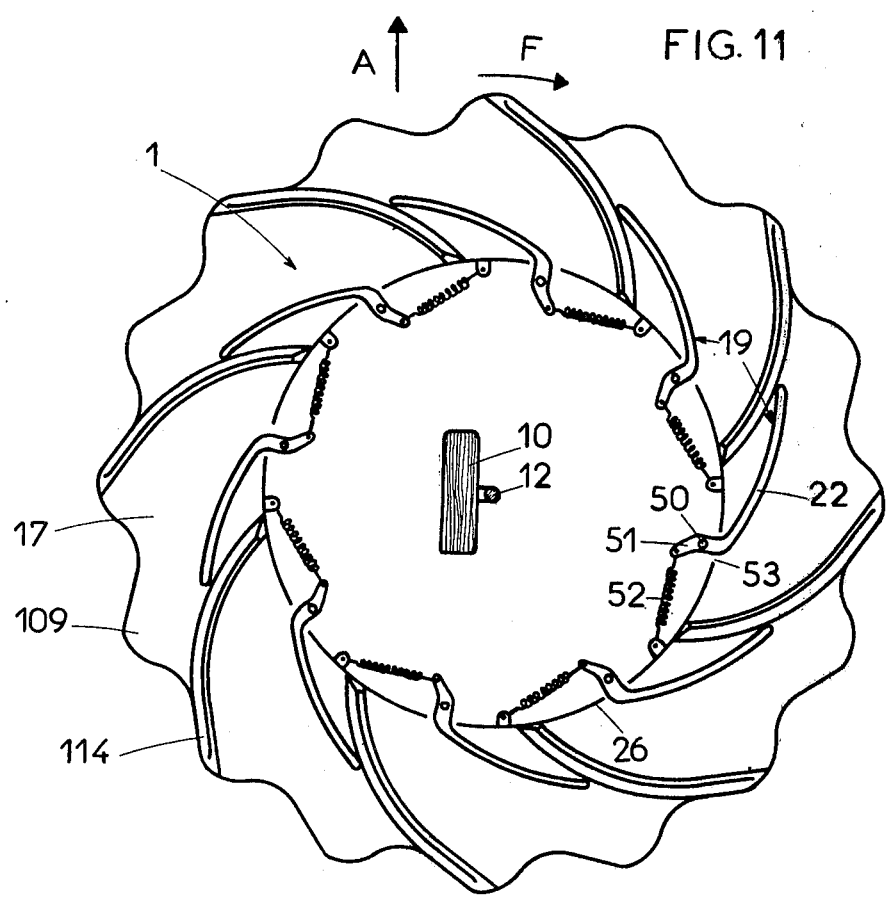
FIG. 11 a view identical to that of FIG. 9 with the drum in the windrowing position.

In the variant of FIGS. 9, 10 and 11, the impelling means (22) can also pivot about spindles (50) which are substantially parallel to the shafts (12, 13) of drms (1, 2). Each of the impelling means (22) has an extension (51) to which is connected a tension spring (52) fixed to wall (26, 27) of drums (1, 2). Spindles (50) and springs (52) are positioned within drums (1, 2) and are protected by the latter. The impelling means (22) extend outwards through slots (53) made in walls (26, 27). The springs (52) exert a tension which pivots the impelling means in a direction opposite to the rotation direction (F or G) of drums (1 and 2).

When working, the impelling means (22) pivot towards the outside counter to the tension of springs (52) under the action of the centrifugal force resulting from the rotation speed of the drums (1, 2). A higher rotation speed is chosen for haytedding than for windrowing. Thus, when haytedding (FIG. 9), the impelling means are brought into a substantially radial position so as to engage well on the fodder. However, during windrowing, they are oriented opposite to the rotation direction (F and G) of drums (1, 2) in order to assist the formation of a windrow (FIG. 11). The rotation speed change of drums (1, 2) can be brought about by means of pinions provided in the gear case (15).

Moreover, according to a (non-illustrated) variant, the drums (1, 2) and skirts (17, 18) can be separately driven. In this way, the latter can have the same rotation speed during tedding and windrowing.

Figure 12:
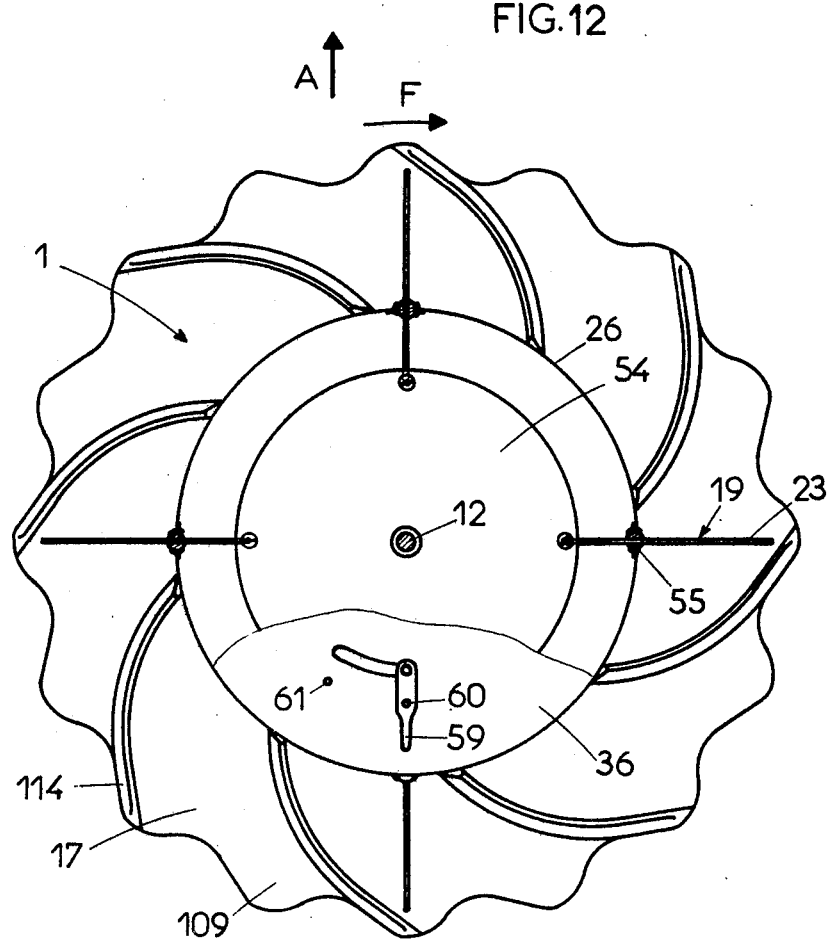
FIG. 12 a part sectional plan view of another variant of the drum according to the invention in the tedding position.
Figure 13:
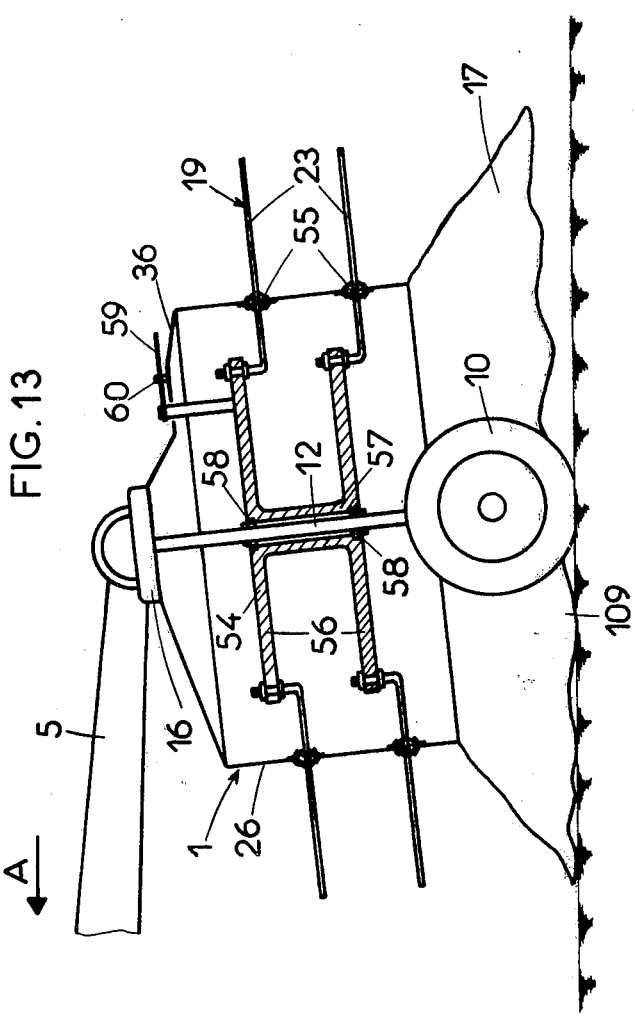
FIG. 13 a vertical section of the drum of FIG. 12.
Figure 14:
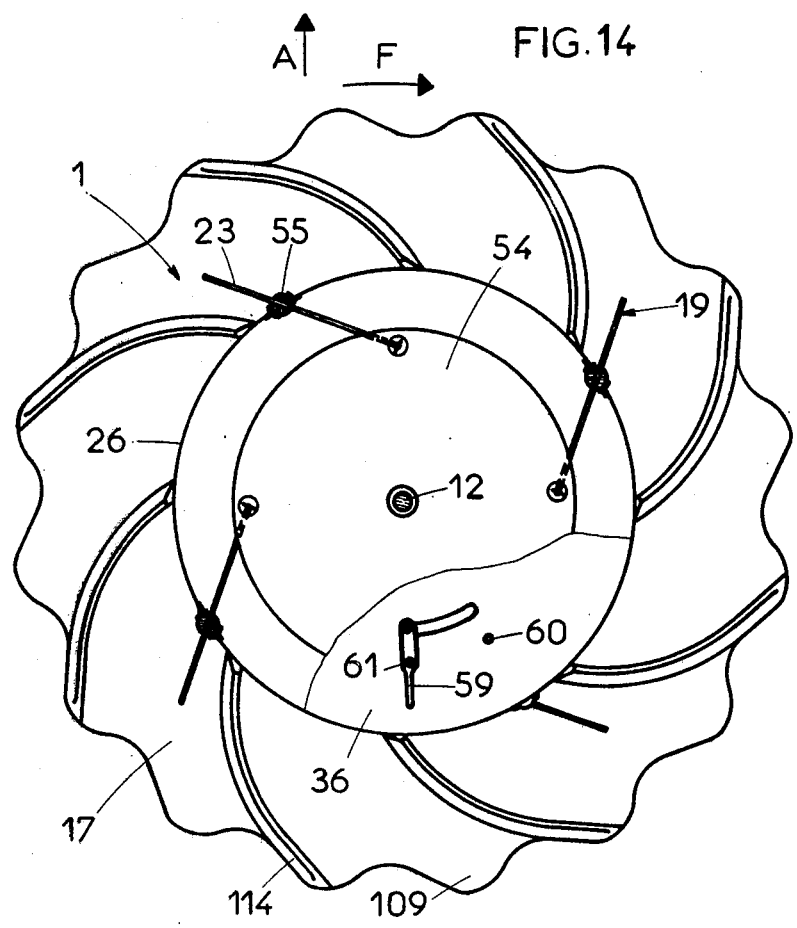
FIG. 14 a view identical to that of FIG. 12 with the drum in the windrowing position.

In the constructional variant of FIGS. 12, 13 and 14, the impelling means (23) are articulated on a regulatable support (54) arranged within the drums (1, 2). The impelling means extend through ball joints (55) provided on walls (26, 27). The regulatable support (54) is constituted by two disks (56) connected by a tube (57) guided on a shaft (12 or 13) of drum (1 or 2) by means of ball bearings (58). As a result of the ball bearings, the support (54) can be rotated about the corresponding shaft (12 or 13) by means of a lever (59). The latter also permits the immobilisation thereof in at least two positions defined by stop members (60, 61) on the upper face (36) of drums (1, 2). Thus, the support (54) makes it possible to transfer and maintain impelling means (23) in a substantially radial position which is suitable for tedding (FIG. 12) and in a position where they are oriented opposite to the rotation direction (F or G) of drum (1 or 2) (FIG. 14), suitable for windrowing.

Figure 15:
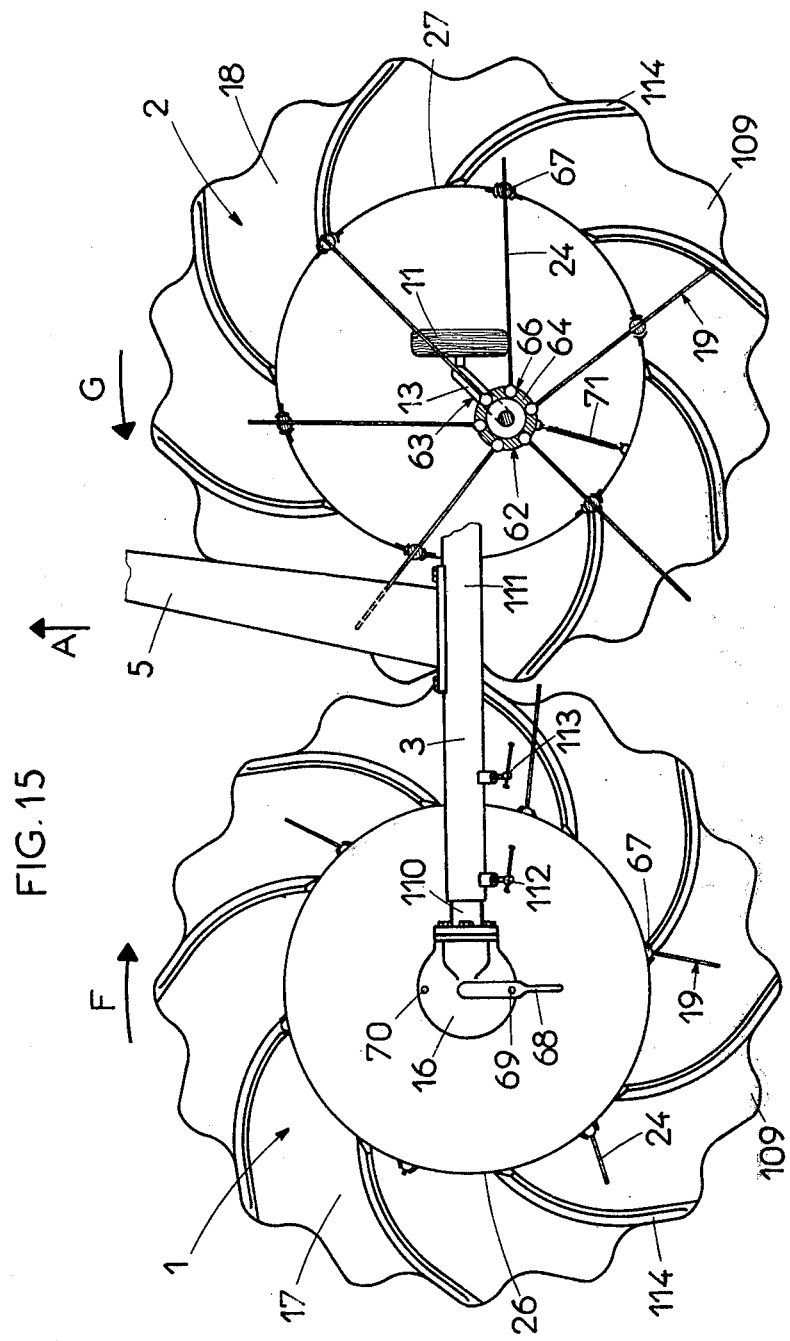
FIG. 15 a plan view of another embodiment of the machine according to the invention in the tedding position.
Figure 16:
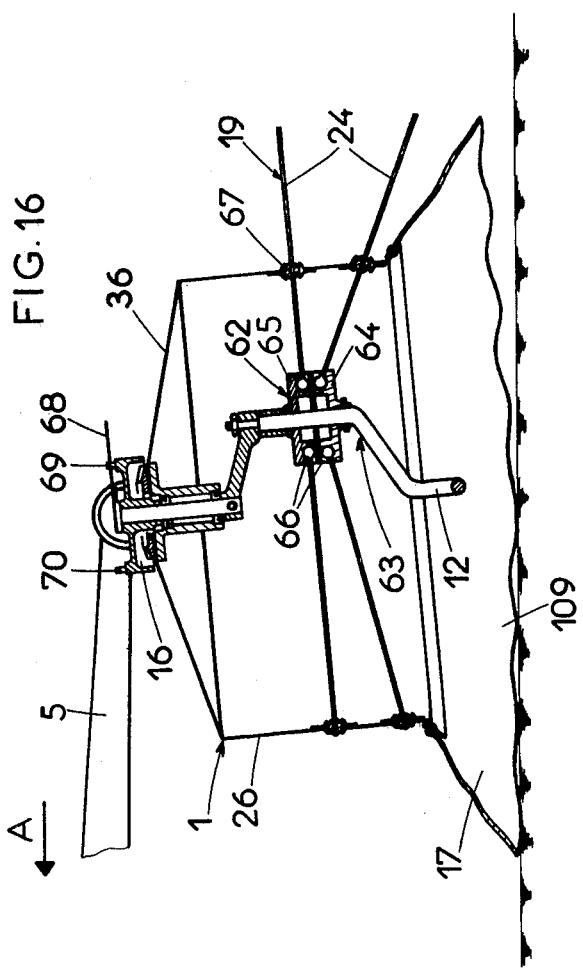
FIG. 16 a vertical section of a drum of the machine according to FIG. 15.
Figure 17:
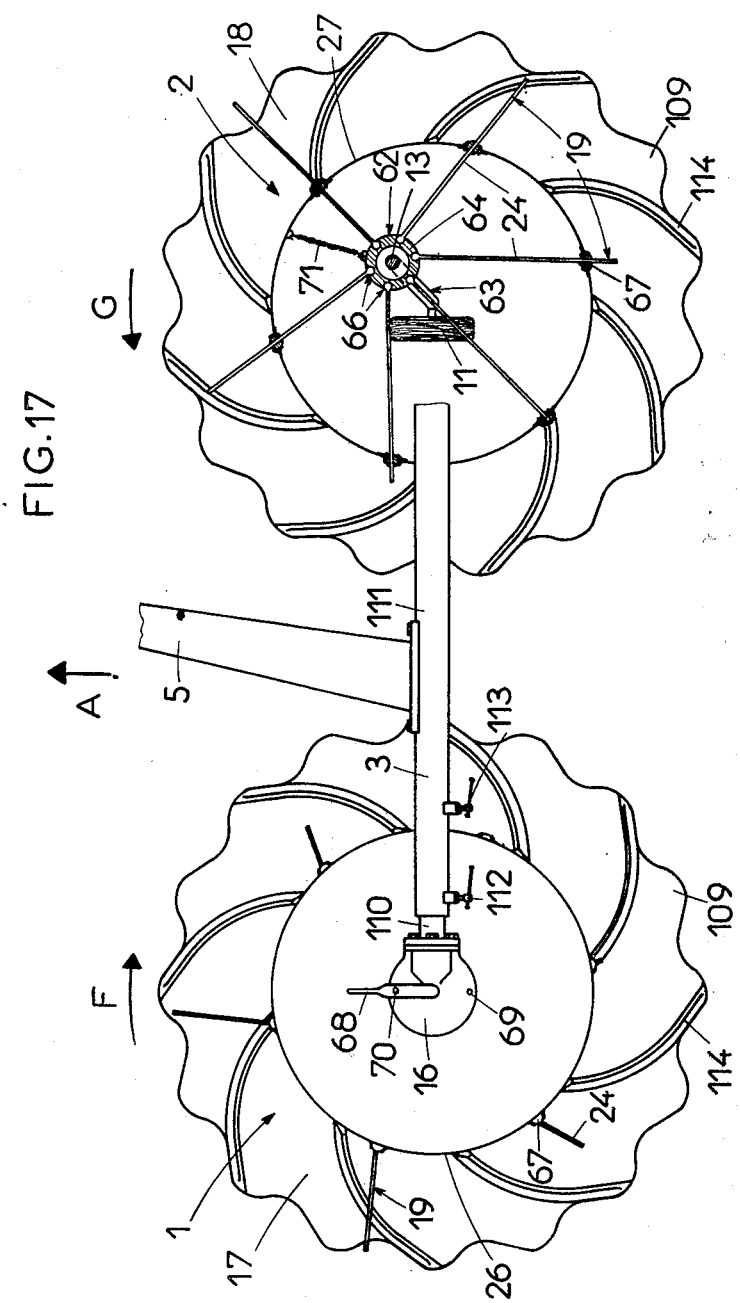
FIG. 17 a plan view of the machine of FIG. 15 in the windrowing position.
Figure 18:
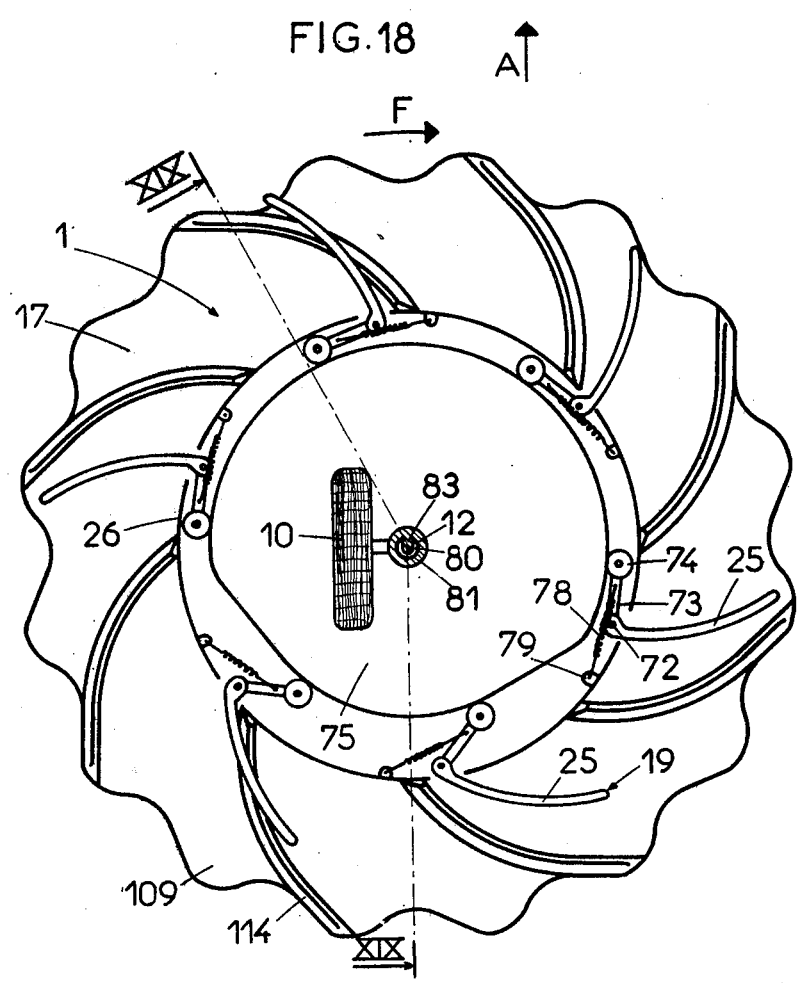
FIG. 18 in section along the plane XVIII—XVIII of FIG. 19 another variant of the drum according to the invention in the tedding position.
Figure 19:
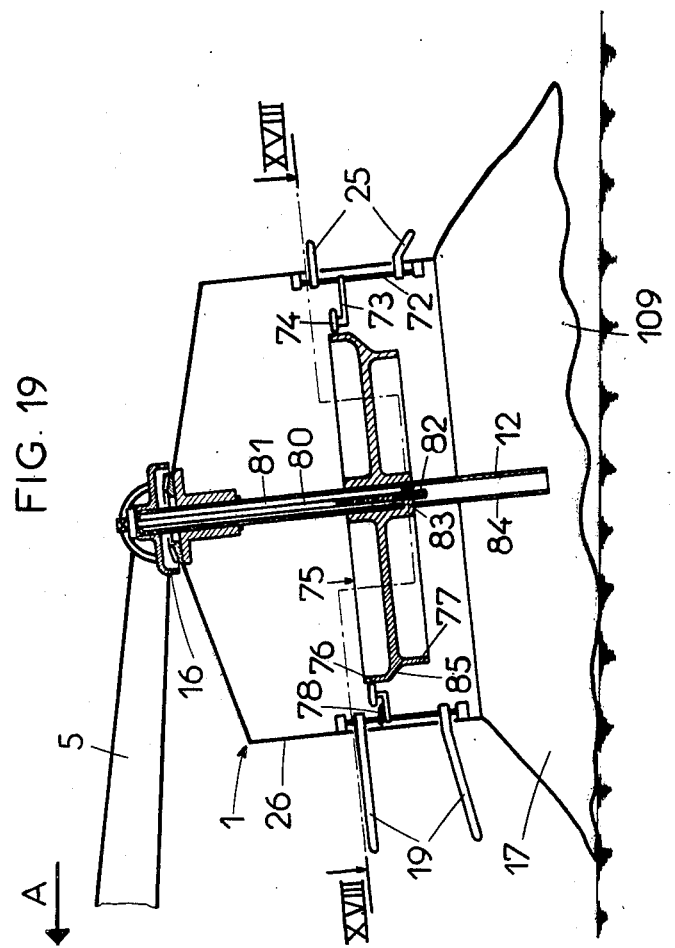
FIG. 19 a section along the plane XIX—XIX of FIG. 18.
Figure 20:
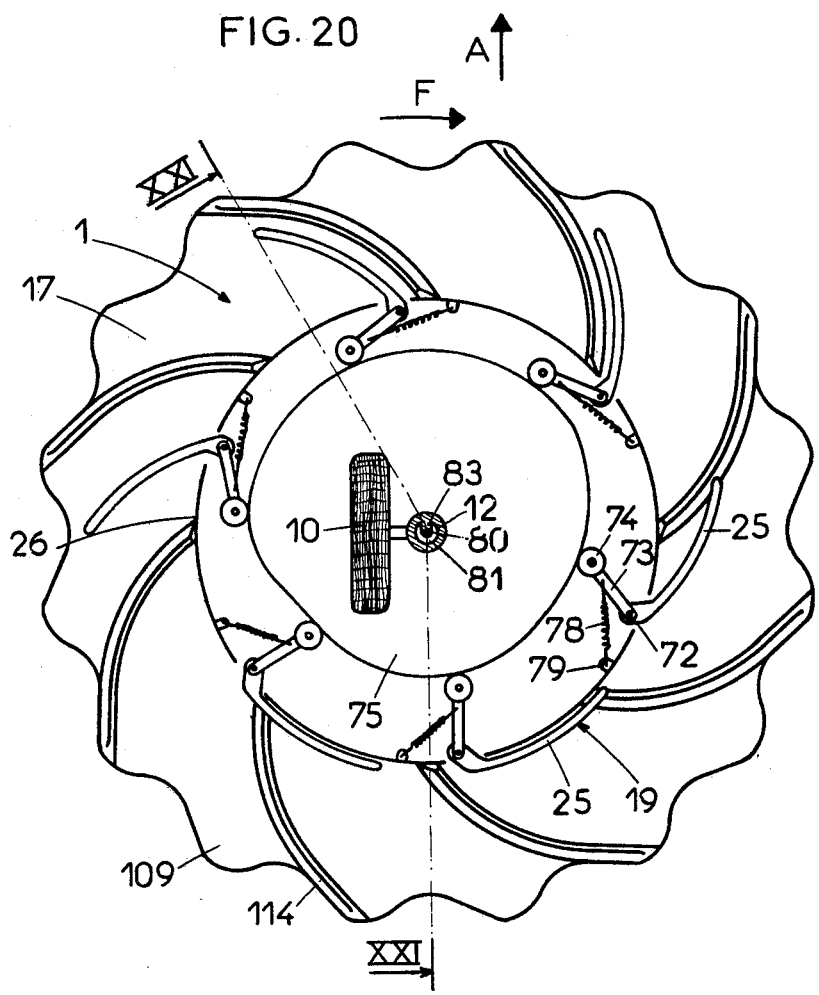
FIG. 20 a view identical to that of FIG. 18 with the drum in the windrowing position.
Figure 21:
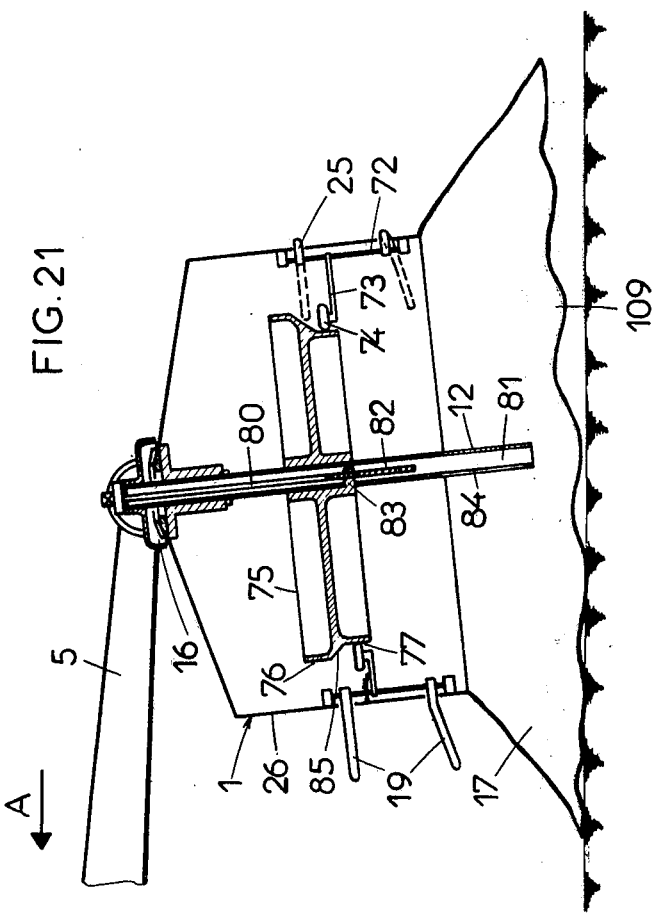
FIG. 21 a section along the plane XXI—XXI in FIG. 20.

In the embodiment of FIGS. 15, 16 and 17, the impelling means (24) are articulated to a support (62) offset with respect to shaft (12, 13) of drums (1, 2). The drum (1,2) defines a central axis, and the shaft (12,13) extends through the interior of the drum (1,2) and is in at least one part concentric with the central axis, and in an other part thereof eccentric therewith. Supports (62) rotate freely on the shafts, which form an elbow (63) at the location of the supports. Each support (62) has two substantially symmetrical portions (64, 65) forming recesses (66) for receiving the inner end of impelling means (24). These ends are spherical so as to permit the orientation of impelling means (24) with respect to support (62) during the rotation of drums (1, 2). The latter have ball joints (67), through which pass the impelling means (24). The supports (62) which are mounted on the eccentric part of the shaft (12,13) and are radially displaced from the central axis, can be transferred and stopped in at least two different positions of the shafts (12, 13) on which they are mounted. To this end, the shafts pass through drums (1, 2) in an upward direction and can be rotated relative to the drums (1, 2) by means of a lever (68) fixed to their upper end. The lever (68) is slightly flexible and can be immmobilised on the stop member (69, 70) for locking the supports (62) in the aforementioned positions. In one of these positions, the supports (62) are positioned in the rear half of the drums (1, 2) (FIG. 15). The impelling means (24) then project to a maximum out of the drums in the rear half of their trajectory. In this part of their trajectory, they engage well on the fodder ensuring the grasping of the fodder and its spreading behind the machine. However, the impelling means (24) are largely located within the drums (1, 2) over the front part of their trajectory. This permits a greater forward inclination of the drums in order to improve the spreading of the fodder, without there being any danger of the lower drive (24) touching the ground. In the second position, supports (62) are located in the front half of drums (1, 2) (FIG. 17). The impelling means (24) then project to a maximum from drums (1, 2) in the front half of their trajectory and return within the drums as they move towards the rear of the machine. Thus, they aid the displacement of the fodder in the front part of their trajectory and progressively free it for the purpose of forming a windrow. When working, each support (62) is rotated by means of a spring (71) connected to the corresponding drum (1, 12).

In the variants of FIGS. 18 to 21, the impelling means (25) are articulted to walls (26, 27) by means of spindles (72) and are guided in each drum (1, 2) by levers (73) provided with rollers (74) which are displaced on a cam (75). This cam is mounted on shAFT (12 or 13) of corresponding drum (1 or 2) and has two guide paths or tracks (76, 77) arranged in a superimposed manner. Cam track (76) guides impelling means (25) during tedding (FIGS. 18 and 19) its profile is such that the impelling means extend substantially radially over most of their trajectory. The other track (77) of cam (75) guides the impelling means (25) during windrowing (FIGS. 20 and 21), its profile is such that in the front part of their trajectory the impelling means are oriented opposite to the rotation direction (F or G) of the corresponding frum (1 or 2) and in the rear part of their trajectory, the impelling means are substantially parallel to walls (26, 27) of drums (1, 2) in order to aid the formation of a windrow. When working, the rollers (74) of the levers (73) are applied to the guide tracks (76, 77) by means of springs (78), whereof one of the ends is attached to the levers and the other to lugs (79) of the walls (26, 27) of drums (1, 2).

The transfer from the tedding position into the windrowing position and vice versa is performed by means of an adjusting screw (80) positioned in bores (81) in shafts (12, 13) of drums (1, 2). It is free in rotation, but fixed in translation. The threaded part (82) of the adjusting screw (80) is engaged in a lug (83) of the cam (75). This lug passes into bore (81) through a slot (84) provided in the corresponding shaft (12, 13). Thus, on rotating the adjusting screw (80) it raises or lowers cam (75) along shaft (12 or 13) on which it is mounted in such a way that the rollers (74) guiding impelling means (25) are located on one or other of the guide tracks (76 or 77). In addition, the cam (75) has an inclined portion (85) between the guide tracks which facilitates the passage of rollers (74) from one guide track to the other on displacing the cam.

Figure 22:
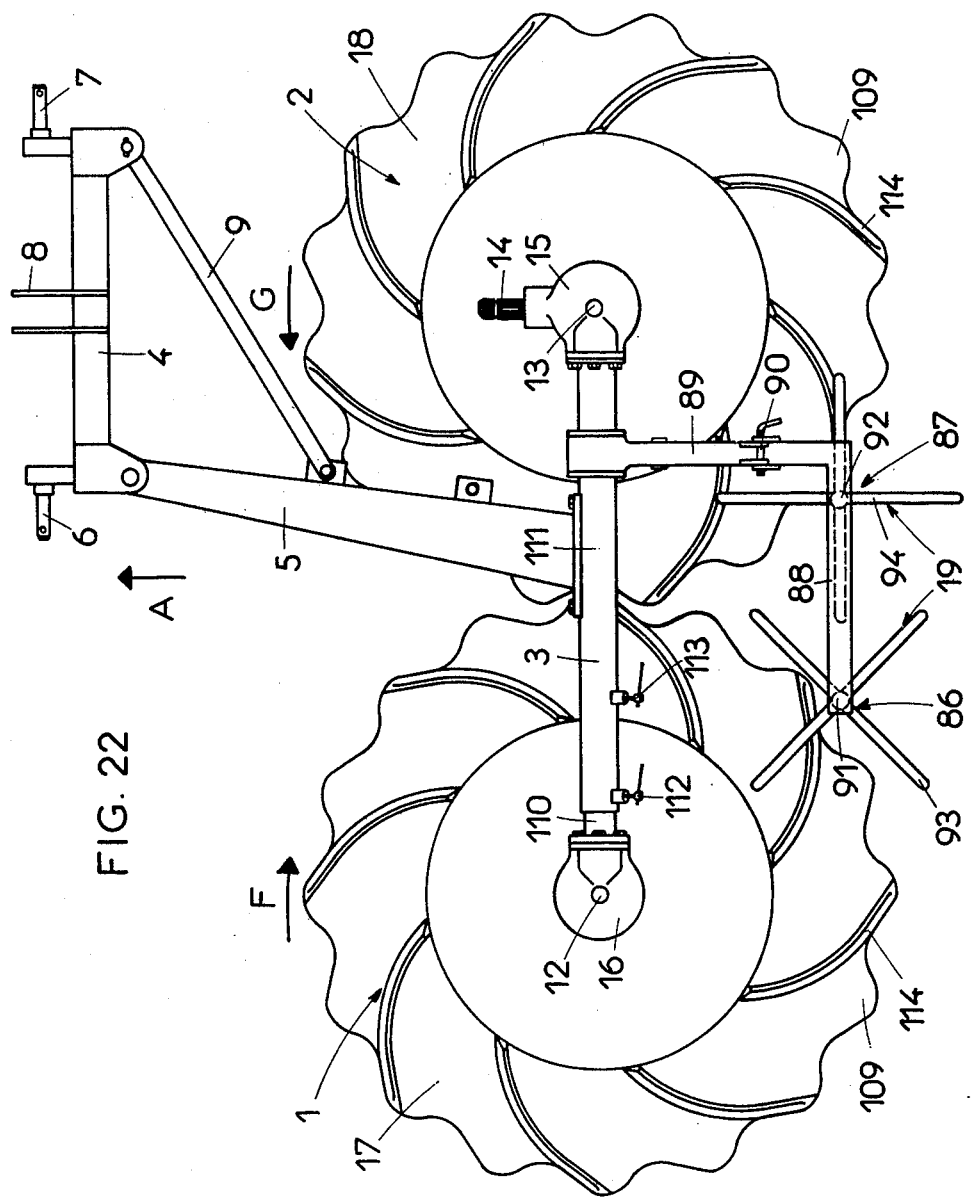
FIG. 22 a plan view of another embodiment of a machine according to the invention in the tedding position.
Figure 23:
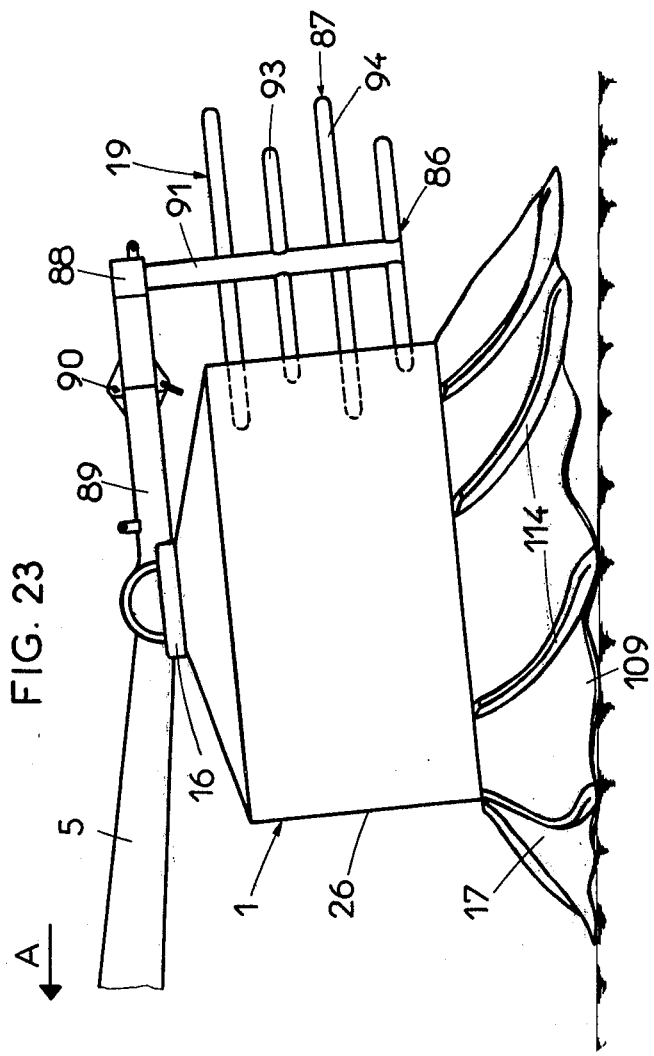
FIG. 23 a side view of the machine of FIG. 22.
Figure 24:
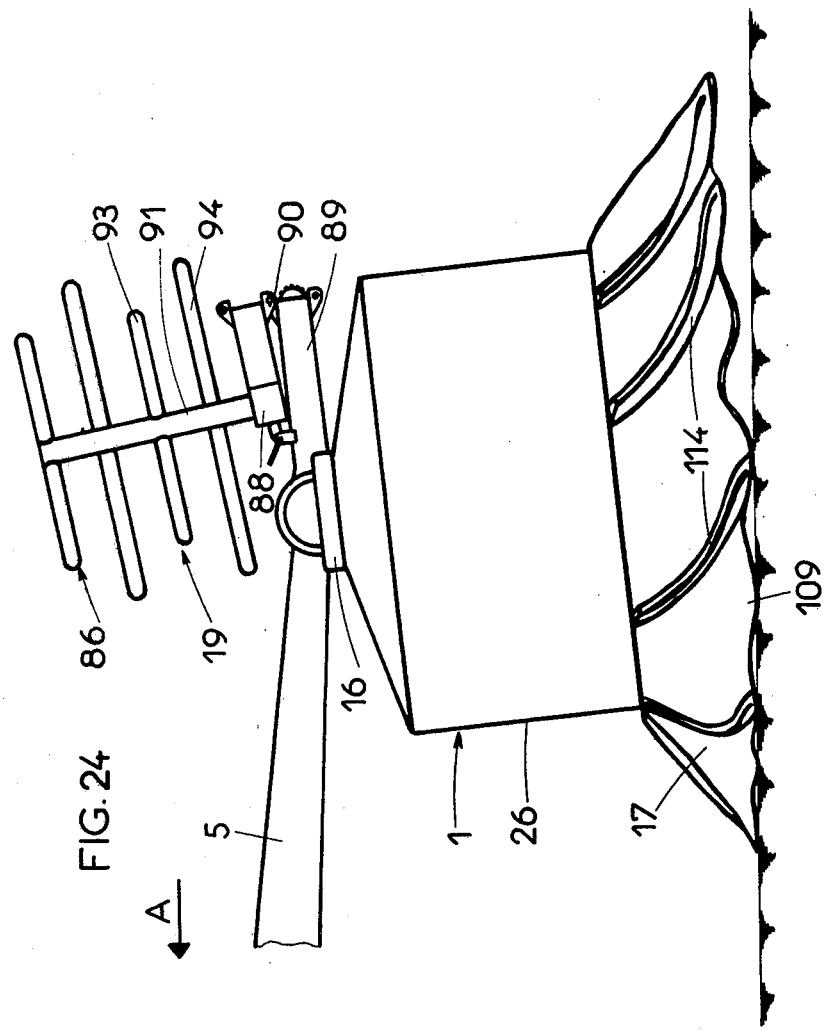
FIG. 24 a view identical to that of FIG. 23 with the machine in the windrowing position.

In the embodiment of FIGS. 22, 23 and 24, the means (19) associated with the skirts (17, 18) of the drums (1, 2) are two spreaders (86, 87) which can be brought into at least two different positions. They are interconnected by a beam (88), which is itself connected to the supporting shaft (3) by means of a carrying arm (89) having an articulation (90). The spreaders (86, 87) are constituted by hubs (91, 92) provided with substantially radial teeth (93, 94). The teeth (93, 94) of the two spreaders (86, 87) lightly mesh and are advantageously vertically displaced from one another in oder to prevent collision thereof.

For hay tedding, the spreaders (86, 87) are positioned behind drums (1, 2), as shown in FIGS. 22 and 23. They are then rotated so as to turn in convergence at the front, viewed in the forward travel direction (A), by means of pinions located in the carrying arm (89) and a cross belt arranged in the connecting beam (88). In this position, the spreaders (86, 87) intercept the fodder transported rearwards by skirts (17, 18) of drums (1, 2) and again spread it behind the machine, whilst turning it over.

For windrowing, the spreaders (86, 87) are tilted upwards about articulation (90) of their carrier arm (89) (FIG. 24). In the new position, they are positioned above drums (1, 2) and have no influence on the fodder gathered up by skirts (17, 18). For windrowing, the spreaders can also be dismantled from the machine to render them inoperative. Moreover, they can also be arranged horizontally without being beyond the scope of the invention.

Figure 25:
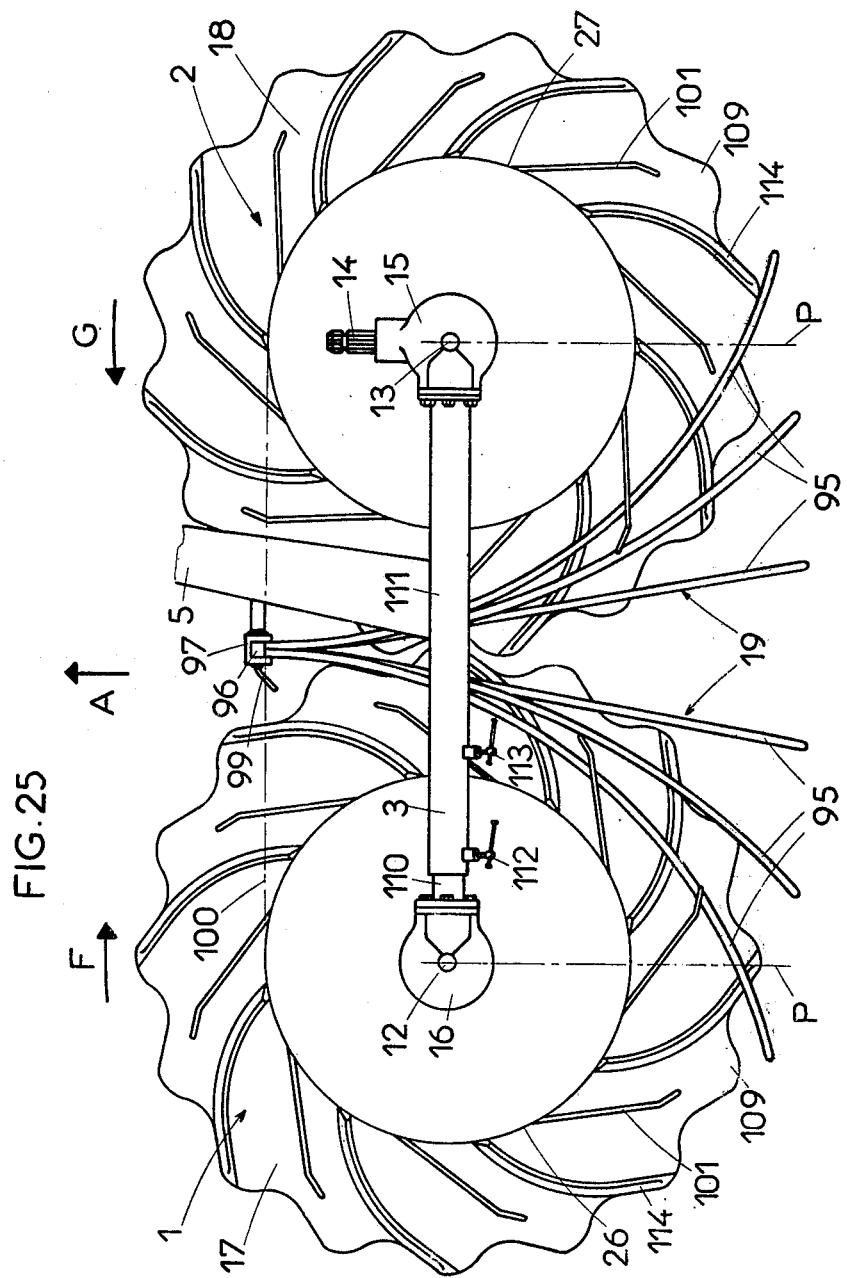
FIG. 25 a plan view of another embodiment of the machine according to the invention in the tedding position.
Figure 26:
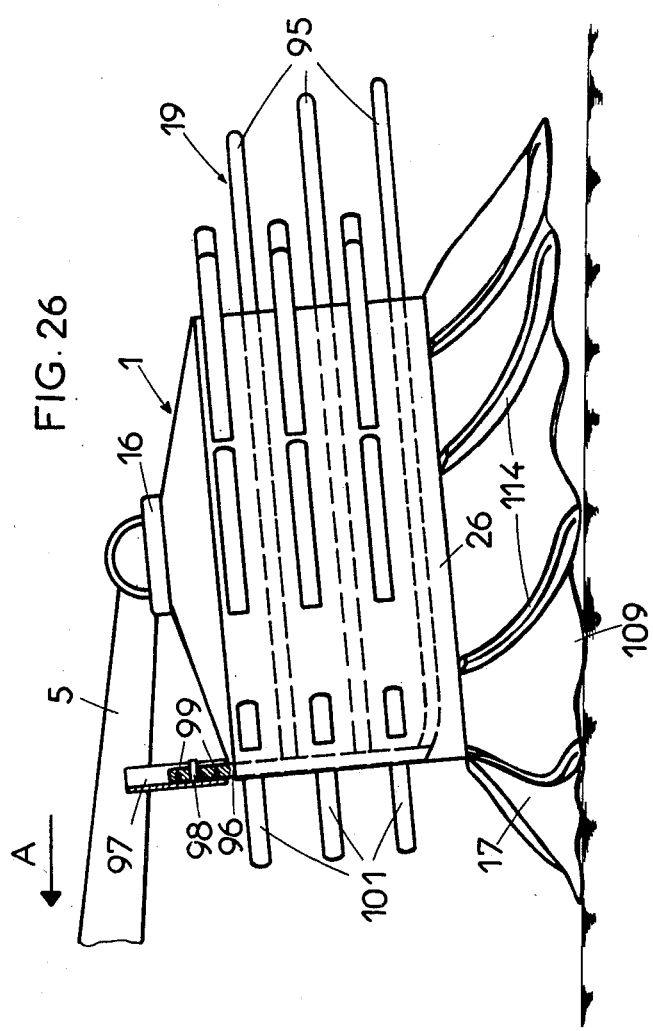
FIG. 26 a side view of the machine of FIG. 25.
Figure 27:
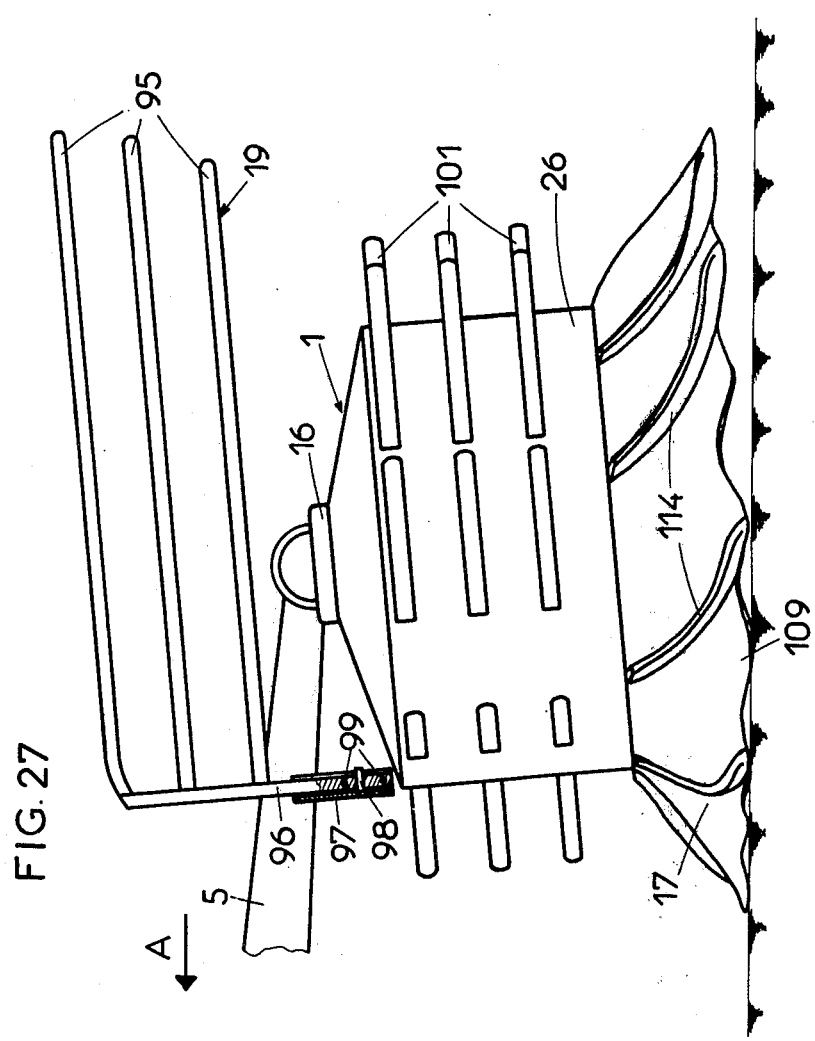
FIG. 27 a view identical to that of FIG. 26 with the machine in the windrowing position.

In the embodiment of FIGS. 25, 26 and 27, means (19) are constituted by rods (95) arranged at different levels and which can be brought into at least two different positions. These rods (95) are integral with a support (96) mounted in a U-shaped bush (97) connected to the connecting beam (5). This fitting in bush (97) is brought about by means of a positioning pin (98) and two bolts (99) equidistant from that pin. These means make it possible to fit the support (96) of the rod (95) in two opposite positions, one intended for tedding and the other for windrowing. In the tedding position shown in FIGS. 25 and 26, the rods (95) extend above the skirts (17, 18) substantially from a line (100) tangential to the front part of drums (1, 2) to the rear of the latter in the form of a mould-board. Those rods (95) which are furthest from the ground extend to the rear of the drums (1, 2) and preferably beyond planes (P) parallel to the forward travel direction (A) and passing through the rotation shafts (12, 13) of the drums. Thus, the fodder gathered up by the skirts (17, 18) slides along the rods (95) towards the rear of the machine. This displacement is aided by the strips (101), fixed to walls (26, 27) of drums (1, 2) and which move the fodder. As the latter slides rearwards, it is turned over by the rods (95) and drops to the ground.

To transfer these rods into the windrowing position, it is merely necessary to draw back the two bolts (99) and to remove the support (96) from the bush (97). The support can then be turned by 180° before being refitted into the bush by means of two bolts (99). In this position, shown in FIG. 27, the rods (95) extend above the drums (1, 2) and have no effect on the fodder.

Figure 28:
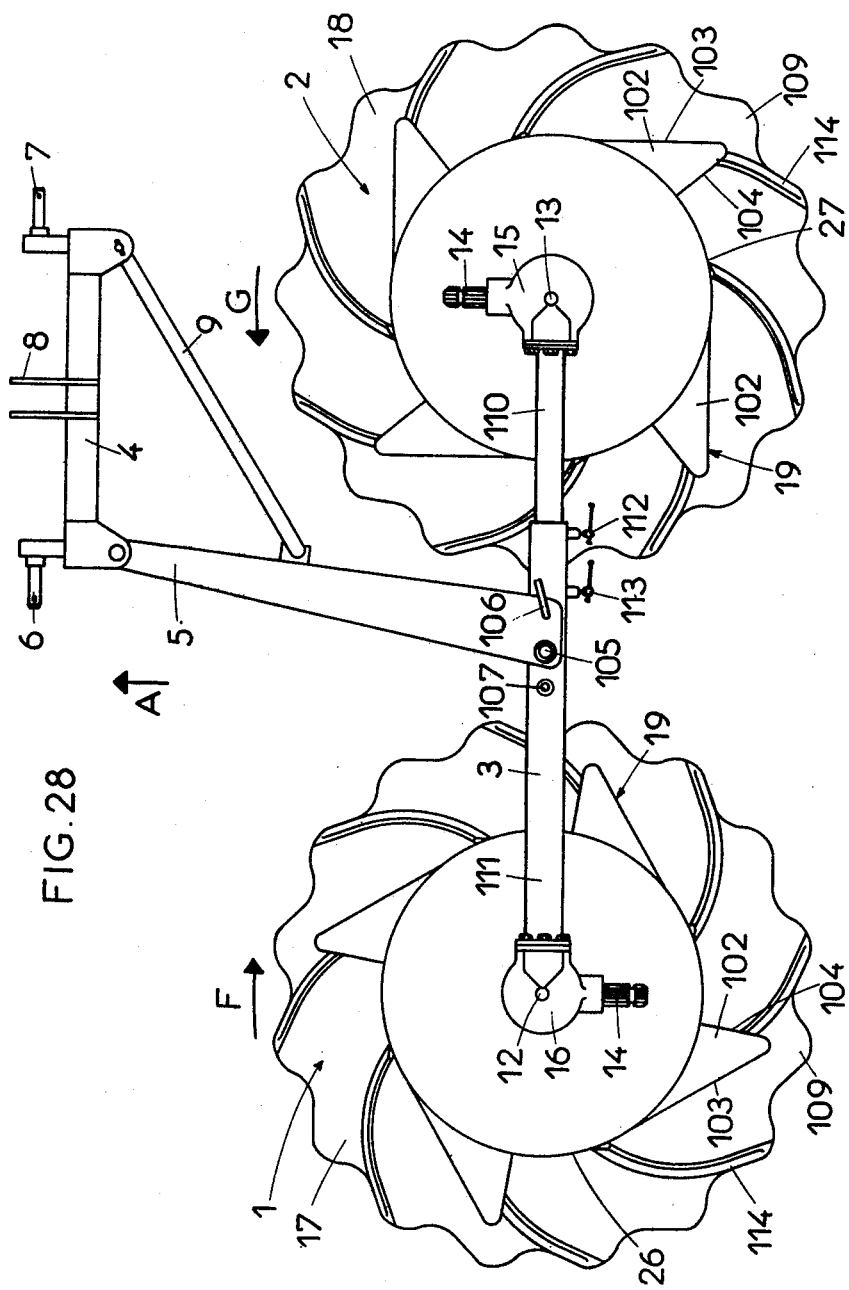
FIG. 28 a plan view of another embodiment of the machine according to the invention in the windrowing position.
Figure 29:
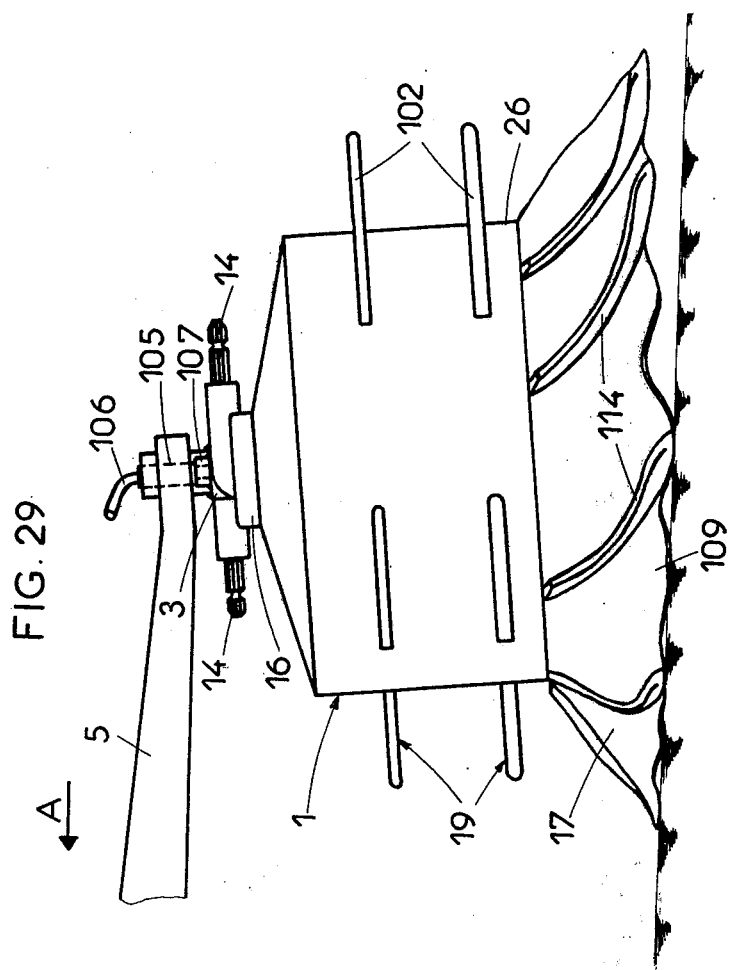
FIG. 29 a side view of the machine of FIG. 28.
Figure 30:
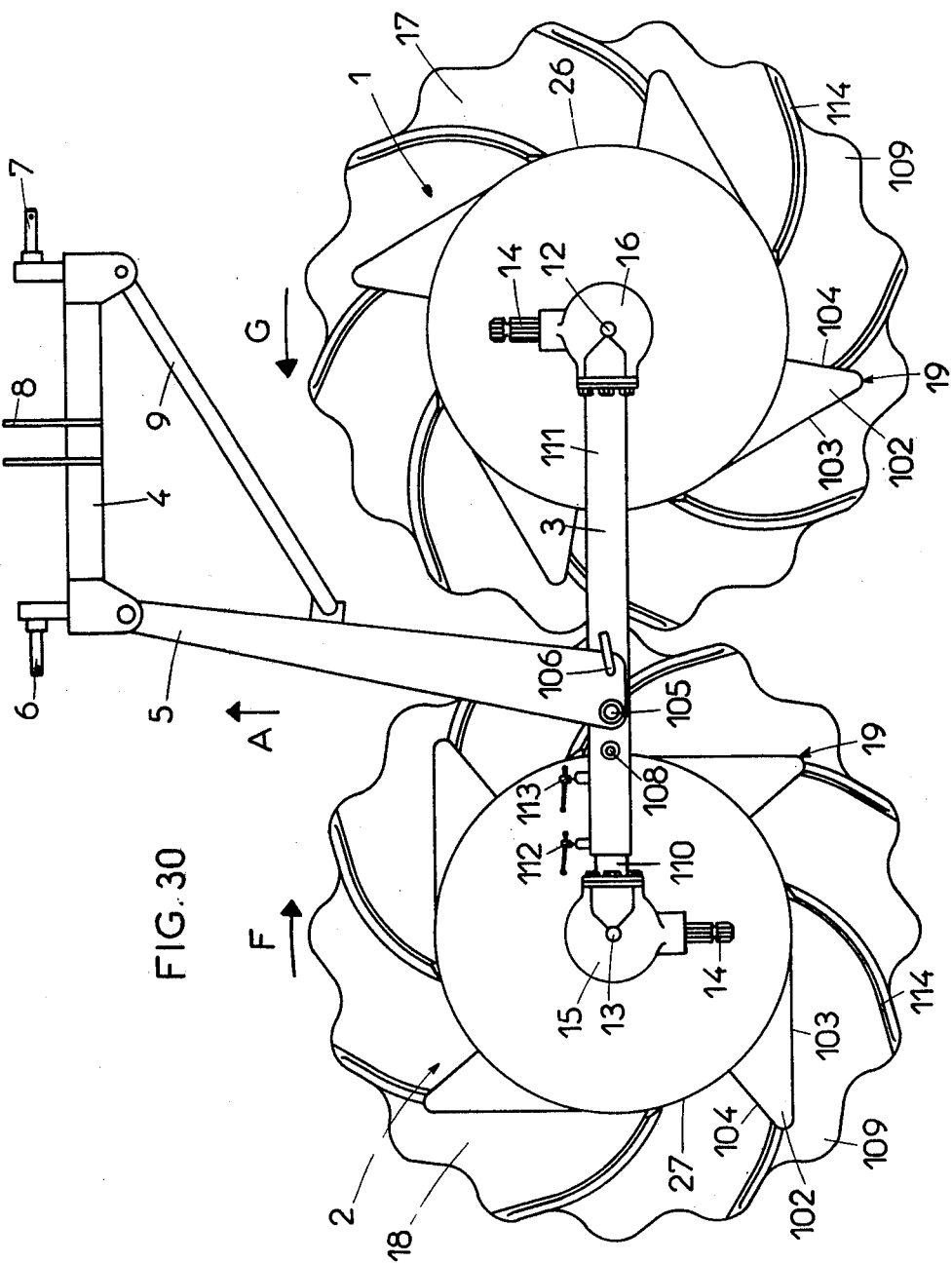
FIG. 30 a plan view of the machine according to FIG. 28 in the tedding position.

In the embodiments of FIGS. 28 to 30, the means (19) associated with skirts (17, 18) of the drums (1, 2) are constituted by substantially V-shaped impelling means (102) which are connected to the walls (26, 27) of the drums (1, 2). They have a side (103) which is substantially tangential to the wall (26 or 27) of the drums (1 or 2) and a side (104) which is in a substantially radial plane. Moreover, the chassis (3) connecting the two drums (1, 2) is articulated to the connecting beam (5) by means of a substantially vertical shaft, (105). This chassis and the two drums (1, 2) can thus pivot in a substantially horizontal plane and can be arrested in at least two positions which differ by 180° by means of a bolt (106). To bring about this locking action, the chassis (3) has two bosses (107, 108), each having a hole in which it is possible to engage the bolt (106).

In one of these positions, drums (1, 2) are arranged in such a way that the sides (103) of impelling means (102) which are substantially tangential to walls (26, 27) come into contact with the fodder to be displaced. Due to their shape, the fodder easily slides along the sides (103) of impelling means (102) as soon as the latter travel towards the rear of the machine. Thus, the fodder is freed for forming a windrow. This position is shown in FIG. 28.

In the other position shown in FIG. 30, drums (1, 2) are inverted through the pivoting of chassis (3). In this case, sides (104) of impelling means (102) come into contact with the fodder. Due to their aggressiveness, the sides entrain the fodder towards the rear of drums (1, 2) and uniformly spread it behind the machine, whilst turning it over.

Due to the different positions of drums (1, 2), each gear case (15, 16) has a shaft end (16) for connection to the cardan shaft connected to the tractor power take-off shaft.

As shown in the attached drawings, the skirts (17, 18) of the drums (1, 2) are peripherally provided with projections (109), which facilitate the gathering up of the fodder. Thus, when working, they disengage the fodder from the ground and aid the penetration of skirts (17, 18) beneath this fodder to be displaced. According to an important feature of the invention, the projections (109) of two adjacent drums (1, 2) mesh in the tedding position. This leads to a slight overlap of their trajectories ensuring that all the fodder is gathered up.

For windrowing, skirts (17, 18) of two adjacent drums (1, 2) are preferably moved away from one another by a distance which is substantially the same or slightly less than the width of the windrow to be formed. This assists in the depositing of laying down of the fodder and advantageously increases the working width of the machine. To this end, the chassis (3) which interconnects the two drums (1, 2) is made in two parts (110, 111) which are nested into one another. The locking of these parts (110, 111) in the different positions is carried out by two set screws (112, 113).

The shirts (17, 18) of the drums (1, 2) also have ribs (114) on their upper face. When working, these ribs aid the gathering up and displacement of the fodder.

It is obvious that the invention is not limited to the exemplified embodiments described hereinbefore and various improvements, modifications or additions can be made thereto, whilst replacing certain components by technical equivalents without being beyond the scope of the invention.

We claim:

1. In a machine for handling cut herbage during forward movement of the machine on the ground,
   in combination,
   a support,
   at least one drum mounted on said support for rotation about an upright axis,
   driving means operable for rotating said drum about said axis,
   a flexible deformable skirt mounted on the lower portion of said drum for rotation therewith and operative for lifting the cut herbage and moving it rearwardly, and
   a plurality of impelling elements, operatively connected to said drum, each element being substantially simultaneously movable together with at least some of the remaining impelling elements relative to said skirt between a tedding position and a windrowing position.

2. A machine as defined in claim 1, wherein each of said impelling elements has two branches of different lengths which enclose an angle with one another.

3. A machine as defined in claim 2, wherein the longer branch of each of said impelling elements extends substantially radially outwardly from said drum in said tedding position, and in substantial parallelism to the outer periphery of said drum in the windrowing position.

4. A machine as defined in claim 2, wherein the shorter branch of each of said impelling elements extends in a direction opposite to the direction of rotation of said drum in said windrowing position, and substantially tangentially to the periphery of said drum in said tedding position.

5. A machine as defined in claim 1, wherein said drum is hollow, and further including a positioning plate situated in the hollow interior of said drum; and wherein each impelling element has an arm connected to said positioning plate.

6. A machine as defined in claim 5, wherein said positioning plate is mounted in the hollow interior of said drum for movement along said upright axis of rotation of said drum; and further comprising means for moving said positioning plate along said upright axis so as to simultaneously move all of said impelling elements between said tedding position and said windrowing position.

7. A machine as defined in claim 5, wherein said hollow drum has a peripheral wall provided with openings for the passage of said arms.

8. A machine as defined in claim 1, further including a plurality of spindles mounting said impelling elements on said drum, respectively, said spindles extending substantially parallel to the axis of rotation of said drum.

9. A machine as defined in claim 8, wherein said drum is hollow and has a peripheral wall; wherein said spindles are situated within said hollow drum; and wherein said peripheral wall is provided with slots through which said impelling means extend from the interior to the exterior of said drum.

10. A machine as defined in claim 8, wherein said impelling elements are located at different elevations relative to said drum; and wherein at least those of said impelling elements which are located close to said skirts extend slightly downwardly from a radial plane of the drum as considered in the outward direction.

11. A machine as defined in claim 8, wherein said drum is hollow, and further including a regulating member centrally arranged within the interior of said drum and so connected to said impelling elements as to displace and arrest said impelling elements in said tedding and windrowing positions, said impelling elements extending substantially radially of said drum in one of said positions, and extending oppositely to the direction of rotation of said drum in the other of said positions.

12. A machine as defined in claim 11, wherein said drum incluedese a shaft; wherein said regulating member includes a hub rotatably mounted on said shaft and having a plurality of arms provided with slots at their free ends; and wherein said impelling means includes a plurality of lugs each engaging in one of said slots.

13. A machine as defined in claim 12, wherein said regulating member is mounted on said shaft for rotation relative thereto; and further comprising means, including a lever, for locking said regulating member to said shaft in two different angularly displaced positions relative thereto.

14. A machine as defined in claim 1, wherein said mounting means includes a plurality of spindles which are substantially parallel to the axis of rotation of said drum; wherein each of said impelling elements is mounted on a respective one of said spindles for pivoting about the same, each having an extension; and further comprising a plurality of springs each connected to and extending between one of said extensions and said drum.

15. A machine as defined in claim 14, wherein said springs are tension springs each of which acts on the associated impelling element in a direction to pivot the same opposite to the direction of rotation of the drum.

16. A machine as defined in claim 14, wherein said impelling elements are so mounted on said spindles and said springs extend in such a direction that the action of centrifugal force on said impelling elements during the rotation of said drum displaces said impelling elements outwardly against the biasing action of said springs thereon.

17. A machine as defined in claim 14, wherein said driving means is so constructed as to rotate said drum at a higher speed during the tedding operation than during the windrowing operation.

18. A machine as defined in claim 14, wherein said drum is hollow and is provided with a plurality of slots; wherein said spindles for said impelling elements and said springs are situated within said hollow drum; and wherein said impelling elements extend from the interior to the exterior of said drum through said slots.

19. A machine as defined in claim 1, wherein said drum is hollow and further including a regulated support situated within said drum; and wherein said impelling elements are articulated to said regulated support.

20. A machine as defined in claim 19, comprising a plurality of ball joints distributed over the periphery of said drum and defining respective passages, said impelling elements extending between the interior and the exterior of the said hollow drum through said passages.

21. A machine as defined in claim 19, wherein said drum has a shaft; wherein said regulated support for said impelling elements is mounted on said shaft for rotation relative thereto; and further comprising means including a lever for arresting said regulated support in at least two positions with respect to said shaft, in one of which said impelling elements extend substantially radially on said drum and in the other of which said impelling elements are inclined opposite to the direction of rotation of said drum.

22. A machine as defined in claim 1, further including a cam member having two cam tracks; and wherein each of said impelling elements has a lever portion and a cam follower roller rotatably mounted on said lever portion and engaging a respective cam track.

23. A machine as defined in claim 22, wherein said cam member is mounted for vertical displacement; wherein said two guide tracks are situated vertically adjacent to one another; and further comprising means including an adjusting screw for vertically displacing said cam member.

24. A machine as defined in claim 22, wherein one of said cam tracks is so arranged for controlling the positions of said impelling elements during the tedding operation that said impelling elements extend substantially radially of said drum over most of the trajectory of the movement with said drum.

25. A machine as defined in claim 24, wherein said impelling elements define a trajectory having a front part and a rear part, and the other of said cam tracks is so arranged for guiding said impelling elements during the windrowing operation that said impelling elements extend opposite to the direction of rotation of said drum in the front part of said trajectory, and substantially parallel to the outer surface of said drum in the rear part of said trajectory.

26. A machine as defined in claim 22, and further comprising a plurality of springs forcing said rollers into engagement with the respective cam track.

27. A machine as defined in claim 1, wherein said impelling elements are guide rods so arranged as to extend in the tedding position upwardly of the skirt substantially from a line tangential to the front part of said drum to the rear of the drum.

28. A machine as defined in claim 27 and further including a support member, said guide rods being rigidly connected to said support member; and means for mounting said support member on said support in each of said positions.

29. A machine as defined in claim 28, wherein said guide rods extend over said drum in the windrowing position.

30. A machine as defined in claim 1; further comprising an additional drum similar to said drum and mounted on said support adjacent to and at a distance from said drum; and wherein said skirts of said drums are provided with peripheral projections, the peripheral projections of one of said drums intermeshing with the peripheral projections of the other drum in the tedding position.

31. A machine as defined in claim 1; further comprising an additional drum similar to said drum and mounted on said support adjacent to and at a distance from said drum; and wherein said converting means includes telescopic means for changing the distance between the axes of rotation of said drums during the conversion between the tedding and the windrowing operation.

32. A machine as defined in claim 2, further comprising hinge pins mounting said impelling elements on said drum for simultaneous rotation about respective axes located in a plane substantially perpendicular to the axis of rotation of said drum, and further comprising cover means for protecting said hinge pins.

33. A machine as defined in claim 1, wherein said drum is hollow and is provided with a plurality of slots; and further including a supporting member situated within said drum and being radially offset from the axis of rotation of said drum, said impelling elements being articulated to said supporting member and extending from the interior to the exterior of said drum through said slots; moving means including a lever for moving said supporting member between at least two different positions and locking said supporting member in each of said positions, said impelling elements defining a trajectory having a front part and a rear part, and projecting outwardly of the drum in said rear part of said trajectory maximally when said lever is in said one of said positions, and maximally outwardly of the drum in said front part of said trajectory when said lever is in the other of said positions.

34. A machine as defined in claim 33, wherein said drum defines a central axis and has a shaft extending through the interior of said drum; and being in at least one part centric with said central axis, and in another part thereof eccentric therewith, and wherein said supporting member is mounted on the eccentric part of said shaft for free rotation relative thereto and for radial displacement from said central axis.

35. A machine as defined in claim 33, and further comprising at least one spring extending between and connected to said supporting member and to said drum.

36. A machine as defined in claim 1, further including a spreader provided with each impelling element, said spreaders being situated on the rear of said drum and at least partially over the skirt thereof in the tedding position of said impelling elements; and means for so rotating said spreaders as to move them in convergence at the front thereof, as considered in said direction of forward movement of the machine.

37. A machine as defined in claim 36, wherein said support includes a main part on which said drum is mounted, and a carrying arm pivotably mounted on said main part and having said spreaders mounted thereon.

38. A machine as defined in claim 37, wherein said spreaders are pivoted upwardly with said carrying arm about the point of articulation of said arm to said main part of said support for the windrowing operation.

39. A machine as defined in claim 1, wherein said impelling elements are substantially V-shaped, affixed to said drum, and extending outwardly therefrom, each of said impelling elements having two impelling surfaces, one of which extends substantially tangentially of said drum, and the other of which extends substantially radially of said drum.

40. A machine as defined in claim 39; further comprising an additional drum similar to said drum and mounted on said support adjacent to and at a distance from said drum; wherein said support is mounted on the machine for pivoting along a substantially horizontal plane between two different positions; and further comprising means for arresting said support in each of said two positions.

41. A machine as defined in claim 40, wherein those impelling surfaces of said impelling elements which extend substantially tangentially of said drum face forwardly as considered in the direction of rotation of said drums when said support is in the windrowing position.

42. A machine as defined in claim 40, wherein those impelling surfaces of said impelling elements which extend substantially radially of the respective drums face forwardly as considered in the direction of rotation of said drums in the tedding position of said support.

43. A machine as defined in claim 1, further comprising means for simultaneously moving all of said impelling elements between said tedding position and said windrowing position.

44. In a machine for handling cut herbage during forward movement of the machine on the ground,
in combination
a support,
at least one drum mounted on said support for rotation about an upright axis,
driving means operable for rotating said drum about said axis,
a flexible deformable skirt mounted on the lower portion of said drum for rotation therewith and operative for lifting the cut herbage and moving it rearwardly, and
converting means associated with said skirt and operative for selectively converting the machine for operation in a tedding manner and, respectively, in a windrowing manner,
wherein said converting means includes impelling means movable between at least two positions relative to said skirt, one for tedding and the other for windrowing,
comprising means for so mounting said impelling means on said drum for rotation therewith and for movement between said two positions relative to said skirt that the diameter of the trajectory of movement of said impelling means is different in the tedding position from that in the windrowing position,
wherein said mounting means mounts said impelling means on said drum for pivoting relative thereto,
wherein said impelling means includes a plurality of impelling elements each having two branches of different lengths which enclose an angle with one another.

45. A machine as defined in claim 44, wherein the longer branch of each of said impelling elements extends substantially radially of said drum in said tedding position, and in substantial parallelism to the outer periphery of said drum in the windrowing position.

46. A machine as defined in claim 44, wherein the shorter branch of each of said impelling elements extends in a direction opposite to the direction of rotation of said drum in said windrowing position, and substantially tangentially to the periphery of said drum in said tedding position.

47. In a machine for handling cut herbage during forward movement of the machine on the ground,
in combination,
a support,
at least one drum mounted on said support for rotation about an upright axis,
driving means operable for rotating said drum about said axis,
a flexible deformable skirt mounted on the lower portion of said drum for rotation therewith and operation for lifting the cut herbage and moving it rearwardly, and
converting means associated with said skirt and operative for selectively converting the machine for operation in a tedding manner and, respectively, in a windrowing manner,
wherein said converting means includes impelling means movable between at least two positions relative to said skirt, one for tedding and the other for windrowing,
comprising means for so mounting said impelling means on said drum for rotation therewith and for movement between said two positions relative to said skirt that the diameter of the trajectory of movement of said impelling means is different in the tedding position from that in the windrowing position,
wherein said mounting means mounts said impelling means on said drum for pivoting relative thereto,
wherein said drum is hollow, wherein said converting means includes a positioning plate situated in the hollow interior of said drum; and wherein said impelling means includes a plurality of impelling elements each having an arm connected to said positioning plate.

48. A machine as defined in claim 47, wherein said positioning plate is mounted in the hollow interior of said drum for movement along the axis of rotation of said drum; and further comprising means for moving said positioning plate along said axis so as to simultaneously move all of said impelling elements between their tedding and windrowing positions.

49. A machine as defined in claim 47, wherein said hollow drum has a peripheral wall provided with openings for the passage of said arms.

50. In a machine for handling cut herbage during forward movement of the machine on the ground,
in combination,
a support,
at least one drum mounted on said support for rotation about an upright axis,
driving means operable for rotating said drum about said axis,
a flexible deformable skirt mounted on the lower portion of said drum for rotation therewith and operative for lifting the cut herbage and moving it rearwardly, and
converting means associated with said skirt and operative for selectively converting the machine for operation in a tedding manner and, respective, in a windrowing manner,
wherein said converting means includes impelling means movable between at least two positions relative to said skirt, one for tedding and the other for windrowing,
comprising means for so mounting said impelling means on said drum for rotation therewith and for movement between said two positions relative to said skirt that the diameter of the trajectory of movement of said impelling means is different in the tedding position from that in the windrowing position,
wherein said mounting means mounts said impelling means on said drum for pivoting relative thereto,
wherein said mounting means includes a plurality of spindles which are substantially parallel to the axis of rotation of said drum.

51. A machine as defined in claim 50, wherein said drum is hollow and has a peripheral wall; wherein said spindles are situated within said hollow drum; and wherein said peripheral wall is provided with slots through which said impelling means extend from the interior to the exterior of said drum.

52. A machine as defined in claim 50, wherein said impelling means includes a plurality of impelling elements located at different elevations relative to said drum; and where at least those of said impelling elements which are located close to said skirts extend slightly downwardly from a radial plane of the drum as considered in the outward direction.

53. A machine as defined in claim 50, wherein said drum is hollow, and wherein said converting means includes a regulating member centrally arranged within the interior of said drum and so connected to said impelling means as to displace the same between and arrest same in said two positions in one of which said impelling means extend substantially radially of said drum and in the other of which they extend oppositely to the direction of rotation of said drum.

54. A machine as defined in claim 53, wherein said drum includes a shaft; wherein said regulating member includes a hub rotatably mounted on said shaft and having a plurality of arms provided with slots at their free ends; and wherein said impelling means includes a plurality of lugs each engaging in one of said slots.

55. A machine as defined in claim 54, wherein said regulating member is mounted on said shaft rotation relative thereto; and further comprising means, including a lever, for locking said regulating member to said shaft in two different angularly displaced positions relative thereto.

56. In a machine for handling cut herbage during forward movement of the machine on the ground,
in combination,
a support,
at least one drum mounted on said support for rotation about an upright axis,
driving means operable for rotating said drum about said axis,
a flexible deformable skirt mounted on the lower portion of said drum for rotation therewith and operative for lifting the cut herbage and moving it rearwardly, and
converting means associated with said skirt and operative for selectively converting the machine for operation in a tedding manner and, respectively, in a windrowing manner,
wherein said converting means includes impelling means movable between at least two positions relative to said skirt, one for tedding and the other for windrowing,
comprising means for so mounting said impelling means on said drum for rotation therewith and for movement between said two positions relative to said skirt that the diameter of the trajectory of movement of said impelling means is different in the tedding position from that in the windrowing position,
wherein said mounting means mounts said impelling means on said drum for pivoting relative thereto,
wherein said mounting means includes a plurality of spindles which are substantailly parallel to the axis of rotation of said drum; wherein said impelling means includes a plurality of impelling elements each mounted on one of said spindles for pivoting about the same and having an extension; and further comprising a plurality of springs each connected to and extending between one of said extensions and said drum.

57. A machine as defined in claim 56, wherein said springs are tension springs each of which acts on the associated impelling element in a direction to pivot the same opposite to the direction of rotation of such drum.

58. A machine as defined in claim 56, wherein said impelling elements are so mounted on said spindles and said springs extend in such a direction that the action of centrifugal force on said impelling elements during the rotation of said drum displaces said impelling elements outwardly against the biasing action of said springs thereon.

59. A machine as defined in claim 56, wherein said driving means is so constructed as to rotate said drum at a higher speed during the tedding operation than during the windrowing operation.

60. A machine as defined in claim 56, wherein said drum is hollow and is provided with a plurality of slots; wherein said spindles for said impelling elements and said springs are situated within said hollow drum; and wherein said impelling elements extend from the interior to the exterior of said drum through said slots.

61. In a machine for handling cut herbage during forward movement of the machine on the ground, in combination,
a support,
at least one drum mounted on said support for rotation about an upright axis,
driving means operable for rotating said drum about said axis,
a flexible deformable skirt mounted on the lower portion of said drum for rotation therewith and operative for lifting the cut herbage and moving it rearwardly, and
converting means associated with said skirt and operative for selectively converting the machine for operation in a tedding manner and, respectively, in a windrowing manner,
wherein said converting means includes impelling means movable between at least two positions relative to said skirt, one for tedding and the other for windrowing,
wherein said drum is hollow; wherein said converting means includes a regulated support situated within said drum; and wherein said impelling means includes a plurality of impelling elements which are articulated to said regulated support.

62. A machine as defined in claim 61, comprising a plurality of ball joints distributed over the periphery of said drum and defining respective passages, said impelling elements extending between the interior and the exterior of the said hollow drum through said passages.

63. In a machine for handling cut herbage during forward movement of the machine on the ground,
in combination,
a support,
at least one drum mounted on said support for rotation about an upright axis,
driving means operable for rotating said drum about said axis,
a flexible deformable skirt mounted on the lower portion of said drum for rotation therewith and operative for lifting the cut herbage and moving it rearwardly, and
converting means associated with said skirt and operative for selectively converting the machine for operation in a tedding manner and, respectively, in a windrowing manner,
wherein said converting means includes impelling means movable between at least two positions relative to said skirt, one for tedding and the other for windrowing,
wherein said converting means includes a cam member having two cam tracks; and wherein said impelling means includes a plurality of impelling elements each having a lever portion and a cam follower roller rotatably mounted on said lever portion and engaging the respective cam track.

64. A machine as defined in claim 63, wherein said cam member is mounted for vertical displacement; wherein said two guide tracks are situated vertically adjacent to one another; and further comprising means including an adjusting screw for vertically displacing said cam member.

65. A machine as defined in claim 63, wherein one of said cam tracks is so configured for controlling the positions of said impelling elements during the tedding operation that said impelling elements extend substantially radially of said drum over most of the trajectory of the movement with said drum.

66. A machine as defined in claim 65, wherein the other of said cam tracks is so configured for guiding said impelling elements during the windrowing operation that said impelling elements extend opposite to the direction of rotation of said drum in the front, and substantially parallel to the outer surface of said drum in the rear, portion of the trajectory of movement with said drum.

67. A machine as defined in claim 63, and further comprising a plurality of springs forcing said rollers into engagement with the respective cam track.

68. A machine as defined in claim 27, wherein said guide rods are situated at several levels relative to said drum; and wherein at least those rods which are situated in the upper level extend to the rear of said drum beyond a plane which is parallel to the forward travel direction of the machine and passes through the axis of rotation of said drum.

* * * * *